US009606958B2

(12) United States Patent
Nixon et al.

(10) Patent No.: US 9,606,958 B2
(45) Date of Patent: Mar. 28, 2017

(54) COLLECTING AND DELIVERING DATA TO A BIG DATA MACHINE IN A PROCESS CONTROL SYSTEM

(71) Applicant: FISHER-ROSEMOUNT SYSTEMS, INC., Round Rock, TX (US)

(72) Inventors: Mark J. Nixon, Round Rock, TX (US); Terrence L. Blevins, Round Rock, TX (US); Daniel D. Christensen, Austin, TX (US); Paul Richard Muston, Narborough (GB); Ken J. Beoughter, Round Rock, TX (US)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 521 days.

(21) Appl. No.: 14/209,002

(22) Filed: Mar. 13, 2014

(65) Prior Publication Data

US 2014/0280678 A1 Sep. 18, 2014

Related U.S. Application Data

(60) Provisional application No. 61/783,112, filed on Mar. 14, 2013.

(51) Int. Cl.
*G06F 15/16* (2006.01)
*G06F 15/173* (2006.01)
*G05B 19/418* (2006.01)

(52) U.S. Cl.
CPC ... *G06F 15/17331* (2013.01); *G05B 19/4185* (2013.01); *G05B 2219/31211* (2013.01); *G05B 2219/31324* (2013.01); *Y02P 90/18* (2015.11)

(58) Field of Classification Search
USPC .......................................... 709/217
See application file for complete search history.

(56) References Cited

U.S. PATENT DOCUMENTS

| 6,285,966 B1 * | 9/2001 | Brown | G05B 19/0425 702/182 |
| 6,768,116 B1 * | 7/2004 | Berman | G01T 1/178 250/374 |
| 7,606,681 B2 * | 10/2009 | Esmaili | G05B 17/02 340/3.1 |
| 7,680,546 B2 * | 3/2010 | Gilbert | G05B 19/0426 700/17 |

(Continued)

*Primary Examiner* — Alicia Baturay
(74) *Attorney, Agent, or Firm* — Marshall, Gerstein & Borun LLP

(57) ABSTRACT

A device supporting big data in a process plant includes an interface to a communications network, a cache configured to store data observed by the device, and a multi-processing element processor to cause the data to be cached and transmitted (e.g., streamed) for historization at a unitary, logical centralized data storage area. The data storage area stores multiple types of process control or plant data using a common format. The device time-stamps the cached data, and, in some cases, all data that is generated or created by or received at the device may be cached and/or streamed. The device may be a field device, a controller, an input/output device, a network management device, a user interface device, or a historian device, and the device may be a node of a network supporting big data in the process plant. Multiple devices in the network may support layered or leveled caching of data.

19 Claims, 6 Drawing Sheets

(56) References Cited

U.S. PATENT DOCUMENTS

| | | | | |
|---|---|---|---|---|
| 8,224,496 | B2* | 7/2012 | Musti | G06F 1/3209 |
| | | | | 700/22 |
| 8,832,236 | B2* | 9/2014 | Hernandez | G05B 19/042 |
| | | | | 318/568.2 |
| 9,122,786 | B2* | 9/2015 | Cammert | G06F 11/3471 |
| 9,229,871 | B2* | 1/2016 | Washiro | G06F 12/0897 |
| 9,397,836 | B2* | 7/2016 | Nixon | H04L 9/32 |
| 2002/0120475 | A1* | 8/2002 | Morimoto | B65D 5/4212 |
| | | | | 705/4 |
| 2007/0112574 | A1* | 5/2007 | Greene | G06F 9/5072 |
| | | | | 340/572.1 |
| 2008/0079596 | A1* | 4/2008 | Baier | G05B 23/0235 |
| | | | | 340/679 |
| 2009/0249237 | A1* | 10/2009 | Jundt | G05B 19/0426 |
| | | | | 715/769 |
| 2009/0294174 | A1* | 12/2009 | Harmer | E21B 47/06 |
| | | | | 175/45 |
| 2014/0067800 | A1* | 3/2014 | Sharma | G06Q 50/30 |
| | | | | 707/736 |
| 2014/0122806 | A1* | 5/2014 | Lin | H04L 67/12 |
| | | | | 711/126 |
| 2014/0250153 | A1* | 9/2014 | Nixon | G05B 15/02 |
| | | | | 707/812 |
| 2014/0372561 | A1* | 12/2014 | Hisano | G08G 1/0112 |
| | | | | 709/217 |
| 2015/0222731 | A1* | 8/2015 | Shinohara | G06Q 10/06 |
| | | | | 709/203 |

* cited by examiner

COLLECTING AND DELIVERING DATA TO A BIG DATA MACHINE IN A PROCESS CONTROL SYSTEM

CROSS REFERENCE TO RELATED APPLICATIONS

This application claims priority to U.S. Application No. 61/783,112, entitled "Collecting and Delivering Data to a Big Data Machine in a Process Control System" and filed on Mar. 14, 2013, the entire disclosure of which is hereby incorporated by reference herein. Additionally, this application is related to U.S. application Ser. No. 13/784,041, entitled "Big Data in Process Control Systems" and filed on Mar. 7, 2013, the entire disclosure of which is hereby incorporated by reference herein.

TECHNICAL FIELD

The present disclosure relates generally to process plants and to process control systems, and more particularly, to devices that support big data in process plants and process control systems.

BACKGROUND

Distributed process control systems, like those used in chemical, petroleum or other process plants, typically include one or more process controllers communicatively coupled to one or more field devices via analog, digital or combined analog/digital buses, or via a wireless communication link or network. The field devices, which may be, for example, valves, valve positioners, switches and transmitters (e.g., temperature, pressure, level and flow rate sensors), are located within the process environment and generally perform physical or process control functions such as opening or closing valves, measuring process parameters, etc. to control one or more process executing within the process plant or system. Smart field devices, such as the field devices conforming to the well-known Fieldbus protocol may also perform control calculations, alarming functions, and other control functions commonly implemented within the controller. The process controllers, which are also typically located within the plant environment, receive signals indicative of process measurements made by the field devices and/or other information pertaining to the field devices and execute a controller application that runs, for example, different control modules which make process control decisions, generate control signals based on the received information and coordinate with the control modules or blocks being performed in the field devices, such as HART®, WirelessHART®, and FOUNDATION® Fieldbus field devices. The control modules in the controller send the control signals over the communication lines or links to the field devices to thereby control the operation of at least a portion of the process plant or system.

Information from the field devices and the controller is usually made available over a data highway to one or more other hardware devices, such as operator workstations, personal computers or computing devices, data historians, report generators, centralized databases, or other centralized administrative computing devices that are typically placed in control rooms or other locations away from the harsher plant environment. Each of these hardware devices typically is centralized across the process plant or across a portion of the process plant. These hardware devices run applications that may, for example, enable an operator to perform functions with respect to controlling a process and/or operating the process plant, such as changing settings of the process control routine, modifying the operation of the control modules within the controllers or the field devices, viewing the current state of the process, viewing alarms generated by field devices and controllers, simulating the operation of the process for the purpose of training personnel or testing the process control software, keeping and updating a configuration database, etc. The data highway utilized by the hardware devices, controllers and field devices may include a wired communication path, a wireless communication path, or a combination of wired and wireless communication paths.

As an example, the DeltaV™ control system, sold by Emerson Process Management, includes multiple applications stored within and executed by different devices located at diverse places within a process plant. A configuration application, which resides in one or more workstations or computing devices, enables users to create or change process control modules and download these process control modules via a data highway to dedicated distributed controllers. Typically, these control modules are made up of communicatively interconnected function blocks, which are objects in an object oriented programming protocol that perform functions within the control scheme based on inputs thereto and that provide outputs to other function blocks within the control scheme. The configuration application may also allow a configuration designer to create or change operator interfaces which are used by a viewing application to display data to an operator and to enable the operator to change settings, such as set points, within the process control routines. Each dedicated controller and, in some cases, one or more field devices, stores and executes a respective controller application that runs the control modules assigned and downloaded thereto to implement actual process control functionality. The viewing applications, which may be executed on one or more operator workstations (or on one or more remote computing devices in communicative connection with the operator workstations and the data highway), receive data from the controller application via the data highway and display this data to process control system designers, operators, or users using the user interfaces, and may provide any of a number of different views, such as an operator's view, an engineer's view, a technician's view, etc. A data historian application is typically stored in and executed by a data historian device that collects and stores some or all of the data provided across the data highway while a configuration database application may run in a still further computer attached to the data highway to store the current process control routine configuration and data associated therewith. Alternatively, the configuration database may be located in the same workstation as the configuration application.

The architecture of currently known process control plants and process control systems is strongly influenced by limited controller and device memory, communications bandwidth and controller and device processor capability. For example, in currently known process control system architectures, the use of dynamic and static non-volatile memory in the controller is usually minimized or, at the least, managed carefully. As a result, during system configuration (e.g., a priori), a user typically must choose which data in the controller is to be archived or saved, the frequency at which it will be saved, and whether or not compression is used, and the controller is accordingly configured with this limited set of data rules. Consequently, data which could be useful in troubleshooting and process analysis is often not archived, and if it is collected, the useful information may have been lost due to data compression.

Additionally, to minimize controller memory usage in currently known process control systems, selected data that is to be archived or saved (as indicated by the configuration of the controller) is reported to the workstation or computing device for storage at an appropriate data historian or data silo. The current techniques used to report the data poorly utilizes communication resources and induces excessive controller loading. Additionally, due to the time delays in communication and sampling at the historian or silo, the data collection and time stamping is often out of sync with the actual process.

Similarly, in batch process control systems, to minimize controller memory usage, batch recipes and snapshots of controller configuration typically remain stored at a centralized administrative computing device or location (e.g., at a data silo or historian), and are only transferred to a controller when needed. Such a strategy introduces significant burst loads in the controller and in communications between the workstation or centralized administrative computing device and the controller.

Furthermore, the capability and performance limitations of relational databases of currently known process control systems, combined with the previous high cost of disk storage, play a large part in structuring data into independent entities or silos to meet the objectives of specific applications. For example, within the DeltaV™ system, the archiving of process models, continuous historical data, and batch and event data are saved in three different application databases or silos of data. Each silo has a different interface to access the data stored therein.

Structuring data in this manner creates a bather in the way that historized data is accessed and used. For example, the root cause of variations in product quality may be associated with data in more than of these data silos. However, because of the different file structures of the silos, it is not possible to provide tools that allow this data to be quickly and easily accessed for analysis. Further, audit or synchronizing functions must be performed to ensure that data across different silos is consistent.

The limitations of currently known process plants and process control system discussed above and other limitations may undesirably manifest themselves in the operation and optimization of process plants or process control systems, for instance, during plant operations, trouble shooting, and/or predictive modeling. For example, such limitations force cumbersome and lengthy work flows that must be performed in order to obtain data for troubleshooting and generating updated models. Additionally, the obtained data may be inaccurate due to data compression, insufficient bandwidth, or shifted time stamps.

"Big data" generally refers to a collection of one or more data sets that are so large or complex that traditional database management tools and/or data processing applications (e.g., relational databases and desktop statistic packages) are not able to manage the data sets within a tolerable amount of time. Typically, applications that use big data are transactional and end-user directed or focused. For example, web search engines, social media applications, marketing applications and retail applications may use and manipulate big data. Big data may be supported by a distributed database which allows the parallel processing capability of modern multi-process, multi-core servers to be fully utilized.

SUMMARY

A device that supports big data in a process control system or plant is configured to collect all (or almost all) of the data that is observed by the device (e.g., data that is directly generated by, created by, or directly received at the device). As such, the device may include a processor that has multiple processing elements (e.g., a multi-core processor) and/or a high density memory or cache. In an embodiment, the collected data may be stored in the cache of the device. The device is further configured to cause the collected data to be transmitted to a unitary, logical data storage area for historization or long-term storage as big data, for example, by streaming the data. The unitary, logical data storage area is configured to store, using a common format, multiple types of data that are generated or created by or related to the process control system, the process plant, and to one or more processes being controlled by the process plant. For example, the unitary, logical data storage area may store configuration data, continuous data, event data, calculated data, plant data, data indicative of a user action, network management data, and data provided by or to systems external to the process control system or plant. In an embodiment, the processor of the device operates to collect all (or almost all) data that is observed by the device, and to stream the collected data to be stored in the unitary, logical data storage area by using a process control system big data network. The device may be a node of the process control system big data network.

The process control system big data network provides an infrastructure for supporting large scale data mining and data analytics of process data and other types of data collected by device that support big data in process control environments. In an embodiment, the process control big data network or system includes a plurality of nodes to collect and store all (or almost all) data that is generated, created, received, and/or observed by devices included in and associated with the process control system or plant. The devices described in the present application may be nodes of such a process control system big data network. Another node of the process control big data network may be a process control system big data apparatus. The process control system big data apparatus may include the unitary, logical data storage area to which the devices cause collected data to be transmitted for storage or historization.

Unlike prior art process control systems, the identity of data that is to be collected at the devices or the nodes of the process control system big data network need not be defined or configured into the devices or nodes a priori. Further, the rate at which data is collected at and transmitted from the devices or nodes also need not be configured, selected, or defined a priori. Instead, a device that supports process control big data may automatically collect or capture data that is generated by, created by, received at, or otherwise observed by the device at the rate at which the data is generated, created, received or observed, and may cause the collected data to be delivered in high fidelity (e.g., without using lossy data compression or any other techniques that may cause loss of original information) to the process control system big data apparatus to be stored (and, optionally, delivered to other nodes or devices).

In an embodiment, a device that supports big data in a process control system or plant is a process control device configured to control a process in the process plant. The process control device may be, for example, a field device configured to perform a physical function to control the process; a controller configured to receive an input and generate, based on the input and a control routine, an output to control the process; or an input/output (I/O) device disposed between and communicatively connecting the controller and one or more field devices. The process control device may include a processor having multiple processing elements and/or a cache configured to store collected data. Typically, the collected data corresponds to the process plant or to the process controlled in the process plant, and includes data that is directly generated by the process control device, created by the process control device, and/or data that is directly received by the process control device. The process control device also includes an interface to a communications network via which the collected data is transmitted for storage in the unitary, logical data storage area. In some embodiments, a particular processing element of the processor of the device may be exclusively designated to cache and cause the collected data to be transmitted to a unitary, logical data storage area for historization.

A method of delivering data (e.g., big data) in a process control system or plant uses a device that is communicatively coupled to a communications network of the process plant. The method may include collecting data at the device, storing the collected data in a cache of the device, and causing at least a portion of the collected data to be transmitted for storage in a unitary, logical data storage area. The unitary, logical data storage area is configured to store, using a common format, multiple types of data from a set of types of data corresponding to the process plant or the process controlled by the process plant, for example, and the set of types of data may include continuous data, event data, measurement data, batch data, calculated data, configuration data, and other types of data. Typically, the data collected at the device corresponds to the process plant or to a process controlled by the process plant, and includes data that is directly generated by the device, data that is created by the device, and/or data that is directly received at the device. A type of the device is one from a set of device types including a field device and a controller. In some embodiments, the set of device types may include other device types, such as user interface devices, network management devices, historian devices, and/or other types of devices. In an embodiment, all data that is observed by the device is collected and caused to be stored at the unitary, logical data storage area.

In an embodiment, devices supporting big data in a process control plant or system are nodes of a process control system big data network corresponding to the process control plant or system. The plurality of devices or nodes may include process control devices, network management devices, user interface devices, gateway device, historian devices, and/or other types of devices. Each node or device may be configured to collect respective first data that the device directly generates or directly receives, and may temporarily store the collected data in a cache. Each node or device may cause at least a portion of the collected data to be transmitted, via the communications network, for storage in a unitary, logical data storage area. Moreover, at least one node or device is further configured to receive second data that was directly generated by, created by, or directly received at another node of the plurality of nodes, and to cause the second data to be forwarded for storage in the unitary, logical data storage area. The communications network is configured to deliver data to be stored in the unitary, logical data storage area, and the unitary, logical data storage area is configured to store multiple types of data from a set of data types corresponding to the process plant or a process controlled by the process plant in a common format. The set of data types may include, for example, continuous data, event data, measurement data, batch data, calculated data, and configuration data.

By using such devices and techniques to support big data in a process control system or plant, a process control system big data system is able to provide sophisticated data and trending analyses for any portion of the stored or historized data. For example, the process control big data system is able to provide automatic data analysis across process data (that, in prior art process control systems, is contained in different database silos) without requiring any a priori configuration and without requiring any translation or conversion. Based on the analyses, the process control system big data system is able to automatically provide in-depth knowledge discovery, and may suggest changes to or additional entities for the process control system. Additionally or alternatively, the process control system big data system may perform actions (e.g., prescriptive, predictive, or both) based on the knowledge discovery. The process control system big data system also is enable and assist users in performing manual knowledge discovery, and in planning, configuring, operating, maintaining, and optimizing the process plant and resources associated therewith.

Knowledge discovery and big data techniques within a process control plant or environment are inherently different than traditional big data techniques. Typically, traditional big data applications are singularly transactional, end-user directed, and do not have strict time requirements or dependencies. For example, a web retailer collects big data pertaining to browsed products, purchased products, and customer profiles, and uses this collected data to tailor advertising and up-sell suggestions for individual customers as they navigate the retailer's web site. If a particular retail transaction (e.g., a particular data point) is inadvertently omitted from the retailer's big data analysis, the effect of its omission is negligible, especially when the number of analyzed data points is very large. In the worst case, an advertisement or up-sell suggestion may not be as closely tailored to a particular customer as could have been if the omitted data point had been included in the retailer's big data analysis.

In process plant and process control environments, though, the dimension of time and the presence or omission of particular data points is critical. For example, if a particular data value is not delivered to a recipient component of the process plant within a certain time interval, a process may become uncontrolled, which may result in a fire, explosion, loss of equipment, and/or loss of human life. Furthermore, multiple and/or complex time-based relationships between different components, entities, and/or processes operating within the process plant and/or external to the process plant may affect operating efficiency, product quality, and/or plant safety. The knowledge discovery provided by the process control system big data techniques described herein may allow such time-based relationships to be discovered and utilized, thus enabling a more efficient and safe process plant that may produce a higher quality product.

Further, by having a processor having multiple processing elements and expanded memory storage in devices, the devices or nodes that support big data in a process control plant or system may be able to overcome many of the performance limitations associated with currently known devices such as memory and processor capabilities. As a result, the devices or nodes may be able to automatically capture, store and archive all types of data including data that may be useful for troubleshooting and process analysis. As well, the devices or nodes in the process control system big data network or system may be able to efficiently utilize communication resources to reduce excessive communication loading and/or time delays in communication and sampling at historians or silos (e.g., loading of controllers, transferring of batch recipes, etc.). As such, all data collection, time stamping, and transmission are carried out in sync with the actual process.

DETAILED DESCRIPTION

Figure 1:
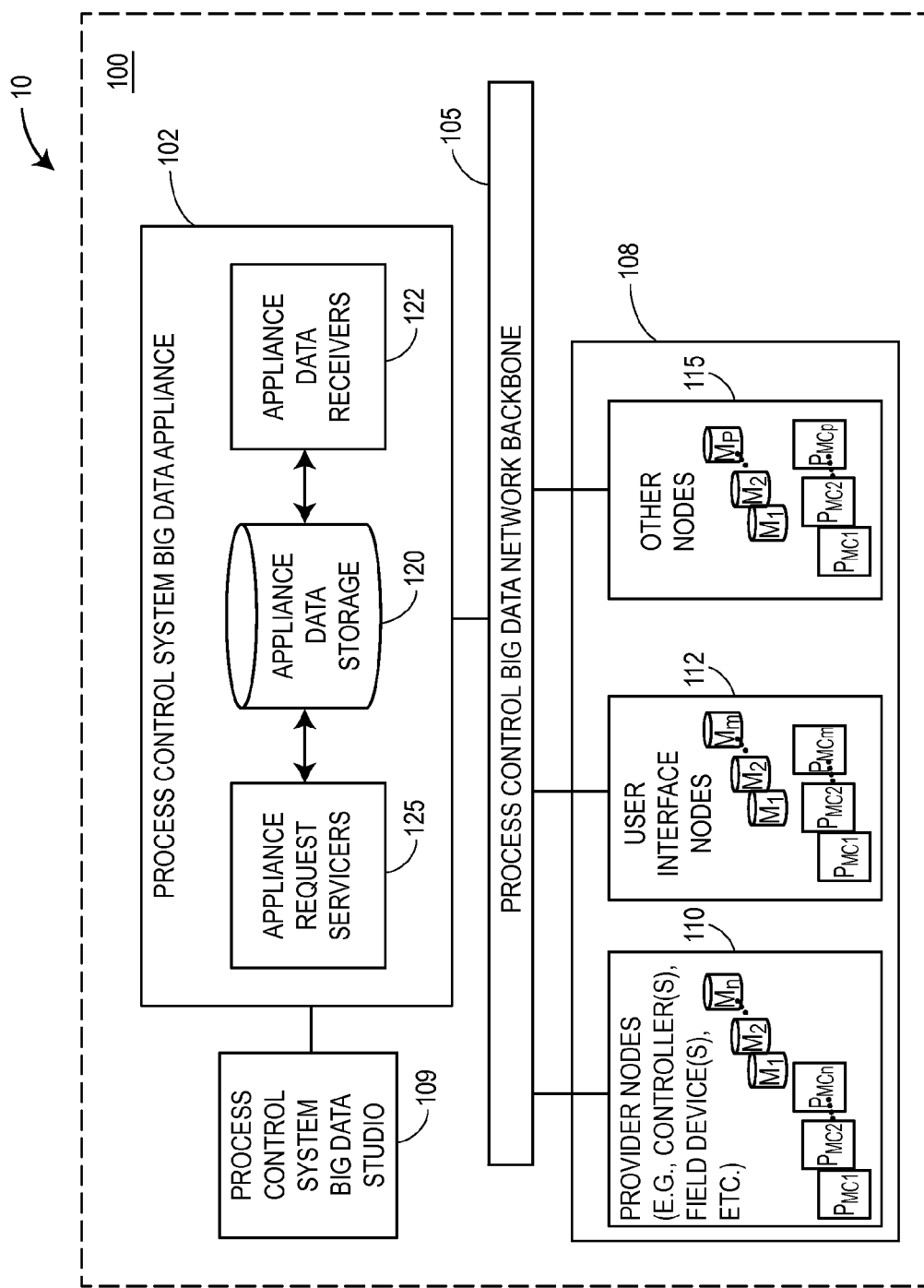
FIG. 1 is a block diagram of an example big data network for a process plant or process control system that includes devices that support big data.

FIG. 1 is a block diagram of an example big data network 100 for a process plant or process control system 10 including devices that support big data in the process plant or system 10. The example process control system big data network 100 includes a process control system big data apparatus or appliance 102, a process control system big data network backbone 105, and a plurality of nodes or devices 108 that support big data and that are communicatively connected to the backbone 105. Process-related data, plant-related data, and other types of data may be collected and cached at the plurality of devices 108, and the data may be delivered, via the network backbone 105, to the process control system big data apparatus or appliance 102 for long-term storage (e.g., "historization") and processing. In an embodiment, at least some of the data may be delivered between devices or nodes of the network 100, e.g., to control a process in real-time. In some configurations, at least some of the devices or nodes 108 of the network 100 are remotely located from the process plant or system 10. In an embodiment, the process control system big data appliance 102 is remotely located from the physical process plant 10.

Any type of data related to the process control system 10 may be collected at the devices 108 and stored at the process control system big data appliance 102 as big data. In an embodiment, process data may be collected and stored. For example, real-time process data such as continuous, batch, measurement and event data that is generated while a process is being controlled in the process plant 10 (and, in some cases, is indicative of an effect of a real-time execution of the process) may be collected and stored. Process definition, arrangement or set-up data such as configuration data and/or batch recipe data may be collected and stored. Data corresponding to the configuration, execution and results of process diagnostics may be collected and stored. Other types of process data may also be collected and stored.

Further, data highway traffic and network management data related to the backbone 105 and of various other communications networks of the process plant 10 may be collected at the devices 108 and stored at the appliance 102. User-related data such as data related to user traffic, login attempts, queries and instructions may be collected and stored. Text data (e.g., logs, operating procedures, manuals, etc.), spatial data (e.g., location-based data) and multi-media data (e.g., closed circuit TV, video clips, etc.) may be collected and stored.

In some scenarios, data that is related to the process plant 10 (e.g., to physical equipment included in the process plant 10 such as machines and devices) but that may not be generated by applications that directly configure, control, or diagnose a process may be collected at the devices 108 and stored at the appliance 102. In an embodiment, data that is created by devices and/or equipment is collected and stored. For example, vibration data and steam trap data is collected and stored. Plant safety data may be collected and stored. Other examples of such plant data include data indicative of a value of a parameter corresponding to plant safety (e.g., corrosion data, gas detection data, etc.), or data indicative of an event corresponding to plant safety. Data corresponding to the health of machines, plant equipment and/or devices may be collected and stored, e.g., data that is created by the devices and/or machines that is used for diagnostic or prognostic purposes For example, equipment data (e.g., pump health data determined based on vibration data and other data) is collected and stored. Data corresponding to the configuration, execution and results of equipment, machine, and/or device diagnostics may be collected and stored. Further, created or calculated data that is useful for diagnostics and prognostics may be collected and stored.

In some embodiments, data generated by or transmitted to entities external to the process plant 10 may be collected at the devices 108 and stored at the appliance 102, such as data related to costs of raw materials, expected arrival times of parts or equipment, weather data, and other external data. In an embodiment, all data that is generated by, created by, received at, or otherwise observed by all devices or nodes 108 that are communicatively connected to the network backbone 105 is collected and caused to be stored at the process control system big data appliance 102 as big data.

The process control system big data network 100 may include a process control system big data studio 109 configured to provide a primary interface into the process control system big data network 100 for configuration and data exploration, e.g., a user interface or an interface for use by other applications. The process control system big data studio 109 may be connected to the big data appliance 102 via the process control system big data network backbone 105, or may be directly connected to the process control system big data appliance 102.

The plurality of devices or nodes 108 of the process control big data network 100 may include several different groups of devices or nodes 110-115 that support big data in process control systems or plants. A first group of devices or nodes 110, referred to herein as "provider nodes 110" or "provider devices 110," may include one or more nodes or devices that generate, route, and/or receive process control data to enable processes to be controlled in real-time in the process plant environment 10. Examples of provider devices or nodes 110 include devices whose primary function is directed to generating and/or operating on process control data to control a process, e.g., wired and wireless field devices, controllers, or input/output (I/O devices). Other examples of provider devices 110 include devices whose primary function is to provide access to or routes through one or more communications networks of the process control system (of which the process control big network 100 is one), e.g., access points, routers, interfaces to wired control busses, gateways to wireless communications networks, gateways to external networks or systems, and other such routing and networking devices. Still other examples of provider devices 110 include devices whose primary function is to temporarily store process data and other related data that is accumulated throughout the process control system 10 and to cause the temporarily stored data to be transmitted for historization at the process control system big data appliance 102, e.g., historian devices or historian nodes.

At least one of the provider devices 110 may be communicatively connected to the process control big data network backbone 105 in a direct manner. In an embodiment, at least one of the provider devices 110 is communicatively connected to the backbone 105 in an indirect manner. For example, a wireless field device is communicatively connected to the backbone 105 via a router, and access point, and a wireless gateway. Typically, provider devices or nodes 110 do not have an integral user interface, although some of the provider devices 100 may have the capability to be in communicative connection with a user computing device or user interface, e.g., by communicating over a wired or wireless communication link, or by plugging a user interface device into a port of the provider device 110.

A second group of devices or nodes 112 that support big data in process control systems or plants is referred to herein as "user interface nodes 112" or "user interface devices 112." The second group of devices 112 includes one or more nodes or devices that each have an integral user interface via which a user or operator may interact with the process control system or process plant 10 to perform activities related to the process plant 10 (e.g., configure, view, monitor, test, analyze, diagnose, order, plan, schedule, annotate, and/or other activities). Examples of these user interface nodes or devices 112 include mobile or stationary computing devices, workstations, handheld devices, tablets, surface computing devices, and any other computing device having a processor, a memory, and an integral user interface. Integrated user interfaces may include a screen, a keyboard, keypad, mouse, buttons, touch screen, touch pad, biometric interface, speakers and microphones, cameras, and/or any other user interface technology. Each user interface node 112 may include one or more integrated user interfaces. User interface nodes 112 may include a direct connection to the process control big data network backbone 105, or may include in indirect connection to the backbone 105, e.g., via an access point or a gateway. User interface nodes 112 may communicatively connect to the process control system big data network backbone 105 in a wired manner and/or in a wireless manner. In some embodiments, a user interface node 112 may connect to the network backbone 105 in an ad-hoc manner.

Of course, the plurality of devices or nodes 108 supporting big data in process control plants and systems is not limited to only provider nodes 110 and user interface nodes 112. One or more other types of devices or nodes 115 may also be included in the plurality of devices or nodes 108. For example, a node 115 of a system that is external to the process plant 10 (e.g., a lab system or a materials handling system) may be communicatively connected to the network backbone 105 of the system 100. A node or device 115 may be communicatively connected to the backbone 105 via a direct or an indirect connection, and a node or device 115 may be communicatively connected to the backbone 105 via a wired or a wireless connection. In some embodiments, the group of other devices or nodes 115 may be omitted from the process control system big data network 100.

In an embodiment, at least some of the devices or nodes 108 supporting big data in process control plants or systems may include an integrated firewall. Further, any number of the devices 108 (e.g., zero devices, one device, or more than one device) may each include respective memory storage (denoted in FIG. 1 by the icons $M_X$) to store or cache tasks, measurements, events, and other observed data in real-time. A memory storage $M_X$ may comprise high density memory storage technology, for example, solid state drive memory, semiconductor memory, optical memory, molecular memory, biological memory, or any other suitable high density memory technology. In some embodiments, the memory storage $M_X$ also includes flash memory. Each memory storage $M_X$ (and, in some cases, the flash memory) is configured to temporarily store or cache data that is generated by, created by, received at, or otherwise observed by its respective device 108. In an embodiment of the process control system big data network 100, all of the devices 110, 112 and any number of the devices 115 may include high density memory storage $M_X$. It is understood that different types or technologies of high density memory storage $M_X$ may be utilized across the set of devices 108, or across a subset of the set of devices 108.

Any number of the devices 108 (for example, zero devices, one device, or more than one device) may each include respective hardware having multiple processing elements, for example, a processor having multiple processing elements such as multiple cores or other co-processing technologies (e.g., quantum, cell, chemical, photonic, biochemical, biological processing technologies). The processors having multiple processing elements or co-processing capabilities are denoted in the FIG. 1 by the icons $P_{MCX}$, and are referred to generally herein as multi-processor element processors.

At least some of the devices 108 may designate at least one of its multiple processing elements of its respective processor $P_{MCX}$ for caching real-time data at the node and, optionally, for causing the cached data to be transmitted for storage at the process control system big data appliance 102. In some embodiments, the one or more designated processing elements for caching and/or transmitting real-time data may be exclusively designated as such (e.g., the one or more designated processing elements may perform no other processing except processing related to caching and/or transmitting big data observed by the device 108). At least some of the devices 108 may designate at least one of its processing elements to perform operations to control a process in the process plant 10. In an embodiment, one or more processing elements may be designated exclusively for performing operations to control a process, and may not be used to cache and transmit big data. It is understood that different types or technologies of processors $P_{MCX}$ having different multi-processing element technologies may be utilized across the set of devices 108, or across a subset the set of devices 108. In an embodiment of the process control system big data network 100, all of the devices 110, 112 and any number of the devices 115 may include some type of processor $P_{MCX}$ that utilizes multi-processing element technology.

While FIG. 1 illustrates the devices 108 as each including both a multi-processing element processor $P_{MCX}$ and a high density memory $M_X$, each of the devices 108 is not required to include both a multi-processing element processor $P_{MCX}$ and a high density memory $M_X$. For example, some of the devices 108 may include only a multi-processing element processor $P_{MCX}$ and not a high density memory $M_X$, some of the devices 108 may include only a high density memory $M_X$ and not a multi-processing element processor $P_{MCX}$, some of the devices 108 may include both a multi-processing element processor $P_{MCX}$ and a high density memory $M_X$, and/or some of the devices 108 may include neither a multi-processing element processor $P_{MCX}$ nor a high density memory $M_X$.

Examples of real-time data that may be collected (and in some cases, cached) by provider nodes or devices 110 may include measurement data, configuration data, batch data, event data, and/or continuous data. For instance, real-time data corresponding to configurations, batch recipes, setpoints, outputs, rates, control actions, diagnostics, health of the device or of other devices, alarms, events and/or changes thereto may be collected. Other examples of real-time data may include process models, statistics, status data, and network and plant management data.

Examples of real-time data that may be collected (and in some cases, cached) by user interface nodes or devices 112 may include, for example, user logins, user queries, data captured by a user (e.g., by camera, audio, or video recording device), user commands, creation, modification or deletion of files, a physical or spatial location of a user interface node or device, results of a diagnostic or test performed by the user interface device 112, and other actions or activities initiated by or related to a user interacting with a user interface node 112.

Collected data may be dynamic or static data. Collected data may include, for example, database data, configuration data, batch data, streaming data, and/or transactional data. Generally, any data that a device 108 generates, receives, or otherwise observes may be collected (and in some cases, cached) with a corresponding time stamp or indication of a time of its generation, reception or observation by the device 108. In an embodiment, all data that a device 108 generates, receives, or observes is cached in its memory storage (e.g., high density memory storage $M_X$) with a respective indication of a time of each data value's collection/caching (e.g., a timestamp).

In an embodiment, each of the devices 110, 112 (and, optionally, at least one of the other devices 115) is configured to automatically collect (and in some cases, cache) real-time data, and to cause the collected/cached data to be delivered to the big data appliance 102 and/or to other devices 108 without requiring lossy data compression, data sub-sampling, or configuring the node for data collection purposes. Thus, the devices 110, 112 (and, optionally, at least one of the other devices 115) of the process control big data system 100 may automatically collect all data that is generated by, created by, received at, or obtained by the device at a rate at which the data is generated, created, received or obtained, and may cause the collected data to be delivered in high fidelity to the process control big data appliance 102 and, optionally, to other devices 108 of the network 100.

Referring again to FIG. 1, the process control system big data network backbone 105 may comprise a plurality of networked computing devices or switches that are configured to route packets to/from various devices 108 of the process control system big data network 100 and to/from the process control big data appliance 102 (which is itself a node of the process control system big data network 100). The plurality of networked computing devices of the backbone 105 may be interconnected by any number of wireless and/or wired links In an embodiment, the process control system big data network backbone 105 may include one or more firewall devices.

The big data network backbone 105 may support one or more suitable routing protocols, e.g., protocols included in the Internet Protocol (IP) suite (e.g., UPD (User Datagram Protocol), TCP (Transmission Control Protocol), Ethernet, etc.), or other suitable routing protocols. In an embodiment, at least some of the devices 108 utilize a streaming protocol such as the Stream Control Transmission Protocol (SCTP) to stream cached data from the devices 108 to the process control big data appliance 102 via the network backbone 105. Typically, each device or node 108 included in the process data big data network 100 may support at least an application layer (and, for some devices, additional layers) of the routing protocol(s) supported by the backbone 105. In an embodiment, each device or node 108 is uniquely identified within the process control system big data network 100, e.g., by a unique network address.

In an embodiment, at least a portion of the process control system big data network 100 may be an ad-hoc network. As such, at least some of the devices 108 may connect to the network backbone 105 (or to another node of the network 100) in an ad-hoc manner.

Continuing with FIG. 1, in the example process control system big data process control network 100, the process control system big data apparatus or appliance 102 is centralized within the network 100, and is configured to receive data (e.g., via streaming and/or via some other protocol) from the devices 108 of the network 100 and to store the received data. As such, the process control big data apparatus or appliance 102 may include a big data appliance data storage area 120 for historizing or storing the data that is received from the devices 108, a plurality of appliance data receivers 122, and a plurality of appliance request servicers 125. Each of these components 120, 122, 125 of the process control system big data appliance 102 is described in more detail below.

The process control system big data storage area 120 may comprise multiple physical data drives or storage entities, such as RAID (Redundant Array of Independent Disks) storage, cloud storage, or any other suitable data storage technology that is suitable for data bank or data center storage. However, to the devices 108 of the network 100, the data storage area 120 has the appearance of a single or unitary logical data storage area or entity. As such, the data storage area 120 may be viewed as a centralized big data storage area 120 for the process control big data network 100 or for the process plant 10. In some embodiments, a single logical centralized data storage area 120 services multiple process plants (e.g., the process plant 10 and another process plant). For example, a centralized data storage area 120 services several refineries of an energy company. In an embodiment, the centralized data storage area 120 is directly connected to the backbone 105. In some embodiments, the centralized data storage area 120 is connected to the backbone 105 via at least one high-bandwidth communication link In an embodiment, the centralized data storage area 120 includes an integral firewall.

The structure of the unitary, logical data storage area 120 supports the storage of all process control system and plant related data, in an embodiment. For example, each entry, data point, or observation stored in the data storage area 120 may include an indication of the identity of the data (e.g., source, device, tag, location, etc.), a content of the data (e.g., measurement, value, etc.), and a timestamp indicating a time at which the data was collected, generated, created, received, or observed. As such, these entries, data points, or observations are referred to herein as "time-series data." The data may be stored in the data storage area 120 using a common format including a schema that supports scalable storage, streamed data, and low-latency queries, for example.

In an embodiment, the schema includes storing multiple observations in each row, and using a row-key with a custom hash to filter the data in the row. The hash is based on the timestamp and a tag, in an embodiment. In an example, the hash is a rounded value of the timestamp, and the tag corresponds to an event or an entity of or related to the process control system. In an embodiment, metadata corresponding to each row or to a group of rows is also stored in the data storage area 120, either integrally with the time-series data or separately from the time-series data. For example, the metadata may be stored in a schema-less manner separately from the time-series data.

In an embodiment, the schema used for storing data at the appliance data storage 120 is also utilized for storing data in the cache $M_X$ of at least one of the devices 108. Accordingly, in this embodiment, the schema is maintained when data is transmitted from the local storage areas $M_X$ of the devices 108 across the backbone 105 to the process control system big data appliance data storage 120.

In addition to the data storage 120, the process control system big data appliance 102 may further include one or more appliance data receivers 122, each of which is configured to receive data packets from the backbone 105, process the data packets to retrieve the substantive data and timestamp carried therein, and store the substantive data and timestamp in the data storage area 120. The appliance data receivers 122 may reside on a plurality of computing devices or switches, for example. In an embodiment, multiple appliance data receivers 122 (and/or multiple instances of at least one data receiver 122) may operate in parallel on multiple data packets.

In embodiments in which the received data packets include the schema utilized by the process control big data appliance data storage area 120, the appliance data receivers 122 merely populate additional entries or observations of the data storage area 120 with the schematic information (and, may optionally store corresponding metadata, if desired). In embodiments in which the received data packets do not include the schema utilized by the process control big data appliance data storage area 120, the appliance data receivers 122 may decode the packets and populate time-series data observations or data points of the process control big data appliance data storage area 120 (and, optionally corresponding metadata) accordingly.

Additionally, the process control system big data appliance 102 may include one or more appliance request servicers 125, each of which is configured to access time-series data and/or metadata stored in the process control system big data appliance storage 120, e.g., per the request of a requesting entity or application. The appliance request servicers 125 may reside on a plurality of computing devices or switches, for example. In an embodiment, at least some of the appliance request servicers 125 and the appliance data receivers 122 reside on the same computing device or devices (e.g., on an integral device), or are included in an integral application.

In an embodiment, multiple appliance request servicers 125 (and/or multiple instances of at least one appliance request servicer 125) may operate in parallel on multiple requests from multiple requesting entities or applications. In an embodiment, a single appliance request servicer 125 may service multiple requests, such as multiple requests from a single entity or application, or multiple requests from different instances of an application.

Figure 2:
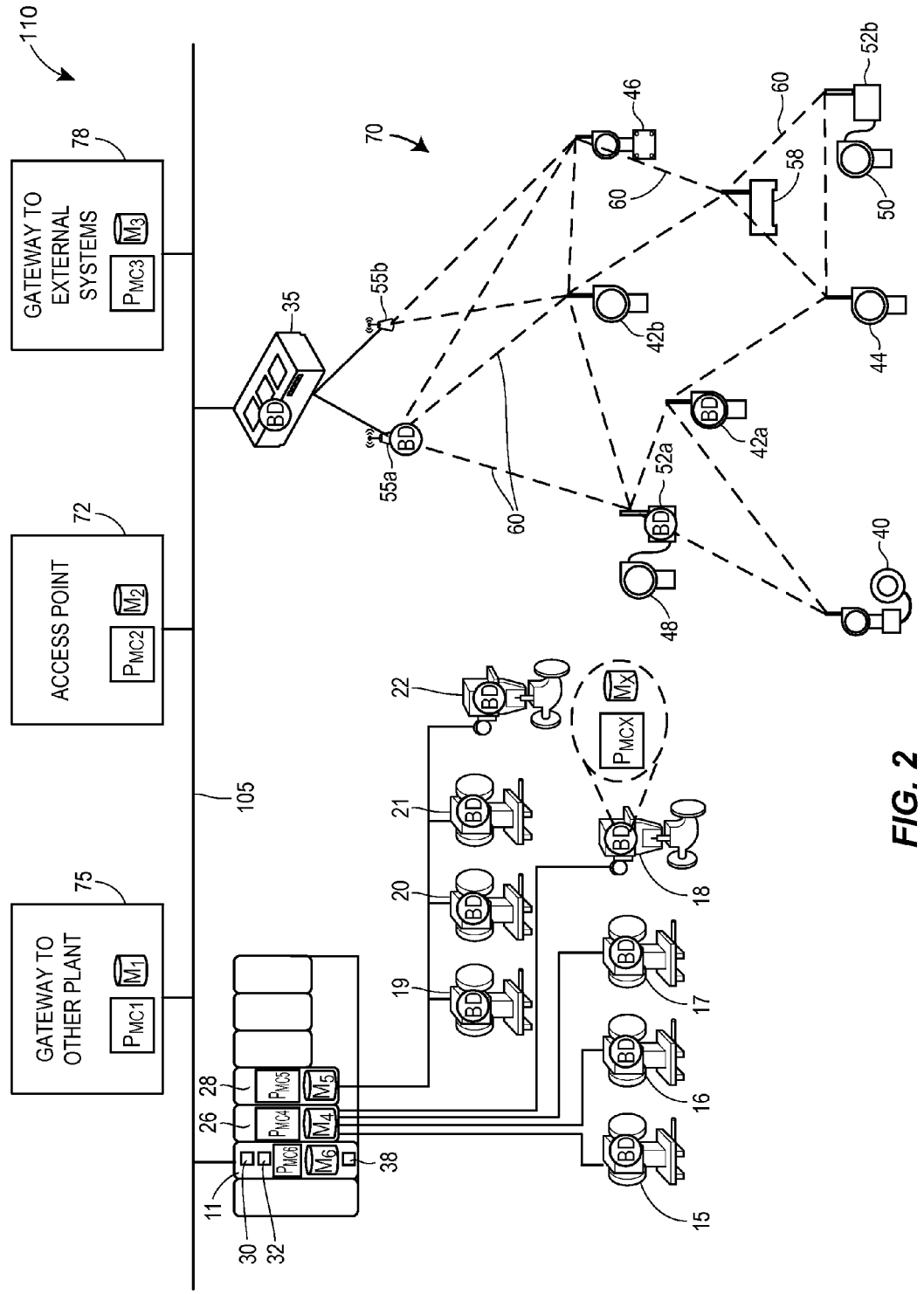
FIG. 2 is a block diagram illustrating an example arrangement of provider devices or nodes included in the process control system big data network of FIG. 1.

A detailed block diagram illustrating example provider devices 110 that support big data in process control systems or plants is shown in FIG. 2. While the devices 110 are discussed with reference to the process plant or process control system 10 of FIG. 1, the example provider devices 110 may be used in or with other process plants or process control systems to support big data therein.

As previously discussed, the provider devices 110 may include devices whose main function is to automatically generate and/or receive process control data that is used to perform functions to control a process in real-time in the process plant environment 10, such as process controllers, field devices and I10 devices. In a process plant environment 10, process controllers receive signals indicative of process measurements made by field devices, process this information to implement a control routine, and generate control signals that are sent over wired or wireless communication links to other field devices to control the operation of a process in the plant 10. Typically, at least one field device performs a physical function (e.g., opening or closing a valve, increase or decrease a temperature, etc.) to control the operation of a process, and some types of field devices may communicate with controllers using I/O devices. Process controllers, field devices, and I/O devices may be wired or wireless, and any number and combination of wired and wireless process controllers, field devices and I/O devices may be nodes 110 of the process control big data network 100 that support big data.

For example, FIG. 2 illustrates a controller 11 that supports big data in the process control network or plant 10. The controller 11 is communicatively connected to wired field devices 15-22 via input/output (I/O) cards 26 and 28, and is communicatively connected to wireless field devices 40-46 via a wireless gateway 35 and the network backbone 105. (In another embodiment, though, the controller 11 may be communicatively connected to the wireless gateway 35 using a communications network other than the backbone 105, such as by using another wired or a wireless communication link). In FIG. 2, the controller 11 is a node 110 of the process control system big data network 100, and is directly connected to the process control big data network backbone 105.

The controller 11, which may be, by way of example, the DeltaV™ controller sold by Emerson Process Management, may operate to implement a batch process or a continuous process using at least some of the field devices 15-22 and 40-46. In an embodiment, in addition to being communicatively connected to the process control big data network backbone 105, the controller 11 may also be communicatively connected to at least some of the field devices 15-22 and 40-46 using any desired hardware and software associated with, for example, standard 4-20 mA devices, I10 cards 26, 28, and/or any smart communication protocol such as the FOUNDATION® Fieldbus protocol, the HART® protocol, the WirelessHART® protocol, etc. In an embodiment, the controller 11 may be communicatively connected with at least some of the field devices 15-22 and 40-46 using the big data network backbone 105. In FIG. 2, the controller 11, the field devices 15-22 and the I/O cards 26, 28 are wired devices, and the field devices 40-46 are wireless field devices. Of course, the wired field devices 15-22 and wireless field devices 40-46 could conform to any other desired standard(s) or protocols, such as any wired or wireless protocols, including any standards or protocols developed in the future.

The controller 11 of FIG. 2 includes a processor 30 that implements or oversees one or more process control routines (e.g., that are stored in a memory 32), which may include control loops. The processor 30 is configured to communicate with the field devices 15-22 and 40-46 and with other nodes (e.g., nodes 110, 112, 115) that are communicatively connected to the backbone 105. It should be noted that any control routines or modules (including quality prediction and fault detection modules or function blocks) described herein may have parts thereof implemented or executed by different controllers or other devices if so desired. Likewise, the control routines or modules described herein which are to be implemented within the process control system 10 may take any form, including software, firmware, hardware, etc. Control routines may be implemented in any desired software format, such as using object oriented programming, ladder logic, sequential function charts, function block diagrams, or using any other software programming language or design paradigm. The control routines may be stored in any desired type of memory, such as random access memory (RAM), or read only memory (ROM). Likewise, the control routines may be hard-coded into, for example, one or more EPROMs, EEPROMs, application specific integrated circuits (ASICs), or any other hardware or firmware elements. Thus, the controller 11 may be configured to implement a control strategy or control routine in any desired manner.

In some embodiments, the controller 11 implements a control strategy using what are commonly referred to as function blocks, wherein each function block is an object or other part (e.g., a subroutine) of an overall control routine and operates in conjunction with other function blocks (via communications called links) to implement process control loops within the process control system 10. Control based function blocks typically perform one of an input function, such as that associated with a transmitter, a sensor or other process parameter measurement device, a control function, such as that associated with a control routine that performs PID, fuzzy logic, etc. control, or an output function which controls the operation of some device, such as a valve, to perform some physical function within the process control system 10. Of course, hybrid and other types of function blocks exist. Function blocks may be stored in and executed by the controller 11, which is typically the case when these function blocks are used for, or are associated with standard 4-20 ma devices and some types of smart field devices such as HART devices, or may be stored in and implemented by the field devices themselves, which can be the case with Fieldbus devices. The controller 11 may include one or more control routines 38 that may implement one or more control loops. Each control loop is typically referred to as a control module, and may be performed by executing one or more of the function blocks.

Other examples of devices 110 that support big data in the process plant or system 10 are the wired field devices 15-22 and the I/O cards 26, 28 shown in FIG. 2. The wired field devices 15-22 may be any types of devices, such as sensors, valves, transmitters, positioners, etc., while the I/O cards 26 and 28 may be any types of 110 devices conforming to any desired communication or controller protocol. In FIG. 2, the field devices 15-18 are standard 4-20 mA devices or HART devices that communicate over analog lines or combined analog and digital lines to the I/O card 26, while the field devices 19-22 are smart devices, such as FOUNDATION® Fieldbus field devices, that communicate over a digital bus to the I/O card 28 using a Fieldbus communications protocol. In some embodiments, though, at least some of the wired field devices 15-22 and/or at least some of the I/O cards 26, 28 may communicate with the controller 11 using the big data network backbone 105. In some embodiments, at least some of the wired field devices 15-22 and/or at least some of the I10 cards 26, 28 are nodes 108 of the process control system big data network 100.

The wireless field devices 40-46 shown in FIG. 2 include an example of devices 110 that support big data in the process plant or system 10 (e.g., device 42a). In FIG. 2, the wireless field devices 40-46 communicate in a wireless network 70 using a wireless protocol, such as the WirelessHART protocol. Such wireless field devices 40-46 may directly communicate with one or more other devices or nodes 108 of the process control big data network 100 that are also configured to communicate wirelessly (using the wireless protocol, for example). To communicate with one or more other nodes 108 that are not configured to communicate wirelessly, the wireless field devices 40-46 may utilize a wireless gateway 35 connected to the backbone 105 or to another process control communications network. While in FIG. 2 only one wireless field device 42a is illustrated as supporting big data in the process plant 10, any number of wireless field devices that support big data may be utilized.

The wireless gateway 35 is another example of a provider device 110 that supports big data in the process control plant or system 10. The wireless gateway 35 may provide access to various wireless devices 40-58 of a wireless communications network 70. In particular, the wireless gateway 35 provides communicative coupling between the wireless devices 40-58, the wired devices 11-28, and/or other nodes or devices 108 of the process control big data network 100 (including the controller 11 of FIG. 2). For example, the wireless gateway 35 may provide communicative coupling by using the big data network backbone 105 and/or by using one or more other communications networks of the process plant 10.

The wireless gateway 35 provides communicative coupling, in some cases, by the routing, buffering, and timing services to lower layers of the wired and wireless protocol stacks (e.g., address conversion, routing, packet segmentation, prioritization, etc.) while tunneling a shared layer or layers of the wired and wireless protocol stacks. In other cases, the wireless gateway 35 may translate commands between wired and wireless protocols that do not share any protocol layers. In addition to protocol and command conversion, the wireless gateway 35 may provide synchronized clocking used by time slots and superframes (sets of communication time slots spaced equally in time) of a scheduling scheme associated with the wireless protocol implemented in the wireless network 70. Furthermore, the wireless gateway 35 may provide network management and administrative functions for the wireless network 70, such as resource management, performance adjustments, network fault mitigation, monitoring traffic, security, and the like. The wireless gateway 35 may be a node 110 of the process control system big data network 100.

Similar to the wired field devices 15-22, the wireless field devices 40-46 of the wireless network 70 may perform physical control functions within the process plant 10, e.g., opening or closing valves or take measurements of process parameters. The wireless field devices 40-46, however, are configured to communicate using the wireless protocol of the network 70. As such, the wireless field devices 40-46, the wireless gateway 35, and other wireless nodes 52-58 of the wireless network 70 are producers and consumers of wireless communication packets.

In some scenarios, the wireless network 70 may include non-wireless devices. For example, a field device 48 of FIG. 2 may be a legacy 4-20 mA device and a field device 50 may be a traditional wired HART device. To communicate within the network 70, the field devices 48 and 50 may be connected to the wireless communications network 70 via a wireless adaptor (WA) 52a or 52b. Additionally, the wireless adaptors 52a, 52b may support other communication protocols such as Foundation® Fieldbus, PROFTBUS, DeviceNet, etc. In FIG. 2, the wireless adaptor 52a is illustrated as being a device 110 that supports big data in the process plant 10.

Furthermore, the wireless network 70 may include one or more network access points 55a, 55b, which may be separate physical devices in wired communication with the wireless gateway 35 or may be provided with the wireless gateway 35 as an integral device. In FIG. 2, the network access point 55a is illustrated as being a device 110 that supports big data in the process plant 10. The wireless network 70 may also include one or more routers 58 to forward packets from one wireless device to another wireless device within the wireless communications network 70. In an embodiment, at least some of the routers 58 may support big data in the process control system 10. The wireless devices 32-46 and 52-58 may communicate with each other and with the wireless gateway 35 over wireless links 60 of the wireless communications network 70.

Accordingly, FIG. 2 includes several examples of provider devices 110 which primarily serve to provide network routing functionality and administration to various networks of the process control system. For example, the wireless gateway 35, the access points 55a, 55b, and the router 58 include functionality to route wireless packets in the wireless communications network 70. The wireless gateway 35 performs traffic management and administrative functions for the wireless network 70, as well as routes traffic to and from wired networks that are in communicative connection with the wireless network 70. The wireless network 70 may utilize a wireless process control protocol that specifically supports process control messages and functions, such as WirelessHART. As shown in FIG. 2, the devices 35, 55a, 52a and 42a of the wireless network 70 support big data in the process control plant or network 10, however, any number of any types of nodes of the wireless network 70 may support big data in the process plant 10.

The devices 110 of the process control big data network 100 that support big data, though, may also include other devices that communicate using other wireless protocols. In FIG. 2, the provider devices or nodes 110 that support big data include one or more wireless access points 72 that utilize other wireless protocols, such as WiFi or other IEEE 802.11 compliant wireless local area network protocols, mobile communication protocols such as WiMAX (Worldwide Interoperability for Microwave Access), LTE (Long Term Evolution) or other ITU-R (International Telecommunication Union Radiocommunication Sector) compatible protocols, short-wavelength radio communications such as near field communications (NFC) and Bluetooth, or other wireless communication protocols. Typically, such wireless access points 72 allow handheld or other portable computing devices (e.g., user interface devices 112) to communicative over a respective wireless network that is different from the wireless network 70 and that supports a different wireless protocol than the wireless network 70. In some scenarios, in addition to portable computing devices, one or more process control devices (e.g., controller 11, field devices 15-22, or wireless devices 35, 40-58) may also communicate using the wireless supported by the access points 72.

The provider devices or nodes 110 that support big data in the process plant or system 10 may include one or more gateways 75, 78 to systems that are external to the immediate process control system 10. Typically, such systems are customers or suppliers of information generated or operated on by the process control system 10. For example, a plant gateway node 75 may communicatively connect the immediate process plant 10 (having its own respective process control big data network backbone 105) with another process plant having its own respective process control big data network backbone. In an embodiment, a single process control big data network backbone 105 may service multiple process plants or process control environments. The network 105 may support one or more process control system big data appliances 102 that are remotely located from the physical process plants, and each big data appliance 102 may service one or more process plants.

In another example, a plant gateway node 75 may communicatively connect the immediate process plant 10 to a legacy or prior art process plant that does not include a process control big data network 100 or backbone 105. In this example, the plant gateway node 75 may convert or translate messages between a protocol utilized by the process control big data backbone 105 of the plant 10 and a different protocol utilized by the legacy system (e.g., Ethernet, Profibus, Fieldbus, DeviceNet, etc.).

The provider devices or nodes 110 that support big data in the process plant or system 10 may include one or more external system gateway nodes 78 to communicatively connect the process control big data network 100 with the network of an external public or private system, such as a laboratory system (e.g., Laboratory Information Management System or LIMS), an operator rounds database, a materials handling system, a maintenance management system, a product inventory control system, a production scheduling system, a weather data system, a shipping and handling system, a packaging system, the Internet, another provider's process control system, or other external systems.

Although FIG. 2 only illustrates a single controller 11 with a finite number of field devices 15-22 and 40-46, this is only an illustrative and non-limiting embodiment. Any number of controllers 11 may be included in the provider devices or nodes 110 of the process control big data network 100, and any of the controllers 11 may communicate with any number of wired or wireless field devices 15-22, 40-46 to control a process in the plant 10. Furthermore, the process plant 10 may also include any number of wireless gateways 35, routers 58, access points 55, wireless process control communications networks 70, access points 72, and/or gateways 75, 78.

As previously discussed, one or more of the provider devices or nodes 110 that support big data in the process plant or system 10 may include a respective multi-processing element processor $P_{MCX}$, a respective high density memory storage $M_X$, or both a respective multi-processing element processor $P_{MCX}$ and a respective high density memory storage $M_X$ (denoted in FIG. 2 by the icon BD). Each provider node 100 may utilize its memory storage $M_X$ (and, in some embodiments, its flash memory) to collect and cache data. Each of the devices 110 may cause its collected data to be transmitted to the process control system big data appliance 102.

Figure 3:
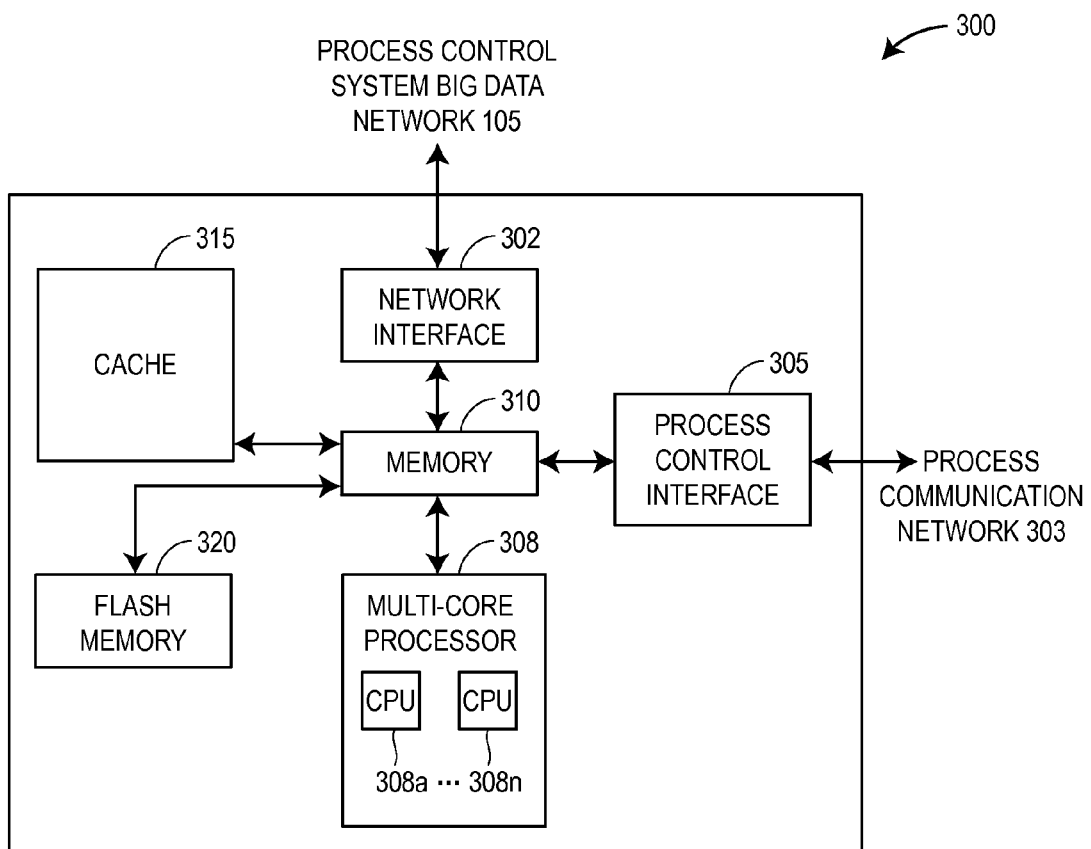
FIG. 3 is a block diagram of an example device configured to support big data in process control systems or plants.

FIG. 3 depicts a block diagram of an example device 300 that supports big data in process plants or systems, such as the process plant 10 of FIG. 1 or other suitable process plants or systems. The device 300 is configured to collect, store and transmit data (e.g., big data) corresponding to a process plant and/or to a process controlled in the process plant. In an embodiment, the device 300 is one of the provider nodes or devices 110. For example, the device 300 may be a process controller (e.g., the controller 11 in FIG. 2), a field device (e.g., one of the field devices 15-22 and 40-46 in FIG. 2), an I/O device (e.g., one of the I/O cards 26, 28 in FIG. 2), a networking or network management device (e.g., the wireless gateway 35, the router 58, the access point 72 in FIG. 2), or a historian device whose primary function is to temporarily store data that is accumulated throughout the process control system 10. In an embodiment, the device 300 is a user interface device (e.g., one of the user interface nodes or devices 112 in FIG. 1), or the device 300 is another type of device 115. It is noted that FIG. 3 is discussed below with reference to FIGS. 1 and 2 for ease of discussion, and is not meant to be limiting.

The device 300 may be a node of a network that supports big data in a process control system, such as the process control system big data network 100 of FIG. 1 or another suitable network. As such, the device 300 may be communicatively coupled to a process control system big data network backbone, such as the backbone 105. For example, the device 300 is coupled to the process control system big data network backbone 105 using a network interface 302.

In an embodiment, the device 300 operates in the process plant or process control system 10 to control a process in real-time, e.g., as part of a control loop. For example, the device 300 may be connected, using a network interface 305, to a process control communications network 303 via which the device 300 may transmit signals to and/or receive signals from other devices to control a process in real-time in the process control system 10. The process control communications network 303 may be a wired or wireless communications network (e.g., the wireless network 70, a Fieldbus network, a wired HART network, etc.), or the process control communications network 303 may include both a wired and a wireless communications network. Additionally or alternatively, the device 300 may transmit and/or receive signals to control the process in real-time using the process control big data network backbone 105, e.g., via the network interface 302. In an embodiment, the network interface 302 and the process control interface 305 may be the same interface (e.g., an integral interface).

The process control interface 305 may be configured to transmit and/or receive data corresponding to a process of the process plant 10 or to a process being controlled in the process plant 10. The process control data may include measurement data (e.g., outputs, rates, etc.), configuration data (e.g., setpoints, configuration changes, etc.), batch data (e.g., batch recipes, batch conditions, etc.), event data (e.g., alarms, process control events, etc.), continuous data (e.g., parameter values, video feeds, etc.), calculated data (e.g., internal states, intermediate calculations, etc.), diagnostic data, data indicative of the health of the device 300 or of another device, and/or any other desired data. Further, the process control data may include data created by the device 300 itself, e.g., for use in purposes such as diagnostics, health monitoring, etc.

In an embodiment, the device 300 is a process controller and the process control interface 305 is used to obtain a configuration of the controller (e.g., from a workstation), and/or to obtain data that is transmitted to or received from a field device connected to the controller to control a process in real-time. For example, the controller may be connected to a wireless HART valve positioner, the valve positioner may generate process control data corresponding to a state of the valve and provide the generated data to the controller via the process control interface 305. The received data may be stored in the controller and/or may be used by the controller to perform a control function or at least a portion of a control loop. In another embodiment, the device 300 is an I/O device that provides a connection between a controller and a field device. In this embodiment, the process control interface 305 includes a field device interface to exchange process control data with the field device, and a controller interface to exchange process control data with the controller. The field device interface is connected to the controller interface so that data may be transmitted to and received from the field device to the controller via the I10 device. In yet another embodiment, the device 300 is a field device performing a physical function to control a process. For example, the device 300 may be a flow meter that measures and obtains process control data corresponding to a current measured flow via the process control interface 305, and that sends a signal corresponding to the measured flow to a controller to control a process via the interface 305. In an embodiment, the device 300 is a process control device that sends/receives diagnostic information via the interface 305 over a communication network or link 303, and causes such diagnostic information to be historized via the interface 302 and the big data backbone 105.

Although the above discussion refers to the device 300 as being a process control device operating in a control loop, the techniques and descriptions provided above apply equally to embodiments in which the device 300 is another type of device associated with the process control plant or system 10. In an example, the device 300 is a network management device such as an access point 72. The network management device observes data (e.g., bandwidth, traffic, types of data, network configuration, login identities and attempts, etc.) via the interface 305, and relays the generated data to the process control system big data network backbone 105 via the network interface 302. In yet another example, the device 300 is a user interface device 112 (e.g., a mobile device, a tablet, etc.) that is configured to allow a user or operator to interact with the process control system or process plant 10. For instance, the network interface 305 in the device 300 may be an interface to a WiFi or NFC communications link that allows the user to perform activities in the process plant 10 such as configuration, viewing, scheduling, monitoring, etc. User logins, commands, and responses may be collected via the interface 305 and transmitted to the process control system big data network backbone 105 via the network interface 302.

In an embodiment, the device 300 supporting big data in process control plants and systems causes indications of data that is directly transmitted by and/or directly received at the interface 305 to be collected at the device 300 and to be transmitted for historization in a unitary, logical data storage area corresponding to the process plant or system 10. For example, the device 300 may cause indications of all data that is transmitted and received via the interface 305 to be collected at the device 300 and to be transmitted, using the network interface 302, to the process control system big data appliance 102 for storage in the process control system big data storage area 120.

In addition to the interfaces 302, 305, the device 300 that supports big data in process control systems may include a multi-processing element processor 308 configured to execute computer-readable instructions, a memory 310, a cache 315, and, optionally, a flash memory 320. Turning first to the multi-processing element processor 308, the multi-processing element processor 308 is a computing component (e.g., an integral computing component) having two or more independent central processing units (CPU) or processing elements 308a-308n. Unlike a single processing element (e.g., single-core) processor that switches between calculations and thus can only perform one task or function at a time, the multi-processing element processor 308 is able to perform multiple tasks or functions concurrently or in parallel by allocating multiple calculations across the multiple processing elements. Tasks or functions performed by the multi-processing element processor 308 may be divided across time amongst the processing elements 308a-308n. Additionally or alternatively, at least some of the processing elements 308a-308n may be designated to perform one or more specific calculations or functions. In an embodiment, at least one processing element of the multi-processing element processor 308 is designated to cause data to be collected or captured (e.g., at the interface 305), to be stored in the cache 315, and to be transmitted from the cache 315 for storage at a centralized data storage area in the process plant environment 10 (e.g., the unitary, logical data storage area 120 in FIG. 1). For instance, a particular processing element may be designated exclusively collect and transmit data that is directly generated by the device 300 (e.g., for transmission), that is created by the device 300, or that is directly received at the device 300. In an embodiment, at least one processing element of the multi-processing element processor 308 is designated to operate the device 300 to control a process in real-time (e.g., to send and/or receive real-time process data and/or implement control routines to control a process) in the process plant 10. For instance, a particular processing element may be designated exclusively to operate the device 300 to control the process in real-time.

In an embodiment, one processing element of the multi-processing element processor 308 is exclusively designated to collect and transmit data associated with the device 300 for big data storage, while another processing element of the multi-processing element processor 308 is exclusively designated to operate the device 300 for real-time process control. In an embodiment, one processing element of the multi-processor processing element 308 is designated to cause process control data to be stored in the cache 315, a second processing element of the multi-processing element processor 308 is designated to cause the cached data (or at least a portion of the cached data) to be for big data storage, and a third processing element of the multi-processing element processor 308 is designated to operate the device 300 to control a process in real-time.

The memory 310 of the device 300 includes one or more tangible, non-transitory computer-readable storage media. The memory 310 may be implemented as one or more semiconductor memories, magnetically readable memories, optically readable memories, molecular memories, cellular memories, and/or the memory 310 may utilize any other suitable tangible, non-transitory computer-readable storage media or memory storage technology. The memory 310 uses mass or high density data storage technology, in an example. The memory 310 stores one or more sets of computer-readable or computer-executable instructions that are executable by at least some of the processing elements 308a-308n of the multi-processing element processor 308 to perform collecting, caching, and/or transmitting of data to be stored at the unitary, logical data storage area.

The cache 315 may utilize data storage technology similar to that utilized by the memory 310, or may utilize different data storage technology. The cache 315 uses mass or high density data storage technology, in an example. In an embodiment, the cache 315 includes a random-access memory (RAM) configured to store data collected by the device 300 prior to the data's transmission for historization at a unitary, logical data storage area, such as the process control system big data storage area 120. The cache 315 may be included in the memory 310, and a size of the cache 315 may be selectable or configurable. Generally, the cache 315 may be written to and read from (e.g., by the multi-processing element processor 308) while the device 300 is in operation or on-line. The memories $M_X$ shown in FIGS. 1 and 2 are instances of the cache 315, for example.

The cache 315 is configured to store one or more data entries. Each data entry includes a value of a datum or data point collected by the device 300, and a respective timestamp or indication of an instance of time at which the data value was generated by, created by, received at, or observed by the device 300. Both the value of the process control data and the timestamp stored in each data entry of the cache 315 may be transmitted for storage to the process control system big data storage area 120, and/or may be transmitted to other nodes and devices in the process plant environment 10. In an embodiment, a schema utilized by the cache 315 for data storage at the device 300 is included in a schema utilized by the big data storage area 120 for data storage at the process control system big data appliance 102. In another embodiment, the data in the cache 315 is stored according to a local schema of the device 300.

The device 300 may collect data without requiring any information that identifies or indicates a priori which data is to be collected. That is, a configuration of the device 300 excludes any indication of identities of the data that is to be collected at the device 300 for eventual historization. In currently known process plants or process control systems, an operator or a user typically must configure a process control device (e.g., a controller) to capture data by identifying which data is to be collected or saved, and, in some embodiments, by specifying the times or frequencies at which said data is to be collected or saved. The identities (and, optionally, the times/frequencies) of the data to be collected are included in the configuration of the process control device. By contrast, in a device 300 supporting process control big data, the device 300 need not be configured with the identities of the data that is desired to be collected and the times/frequencies of its collection. Indeed, in an embodiment, all data that is directly generated by and/or directly received at the device 300 is automatically collected.

Further, the rate at which data is collected at and/or transmitted from the device 300 also need not be configured into the device 300. That is, the rate at which data is collected and/or transmitted is excluded from a configuration of the device 300. Instead, the device 300 may automatically cause the collected data to be transmitted or streamed from the device 300 for historization, in an embodiment. In an example, the device 300 is configured to stream at least some of the data in real-time as the data is generated, created, received or otherwise observed by the device 300 (e.g., the device 300 may not temporarily store or cache the data, or may store the data for only as long as it takes the node to process the data for streaming). Still further, the device 300 may stream data without using lossy data compression or any other techniques that may cause loss of original information.

In an embodiment, the device 300 temporarily stores at least some of the collected data in its cache 315, and pushes at least some of the data from its cache 315 when the cache 315 is filled to a particular threshold. The threshold of the cache may be adjustable. In some scenarios, the device 300 pushes at least some of data from its cache 315 when a resource (e.g., a bandwidth of the network 105, the processor 308, or some other resource) is sufficiently available. An availability threshold of a particular resource may be adjustable.

In an embodiment, the device 300 temporarily stores at least some of the collected data in its cache 315, and pushes at least some of the data stored in its cache 315 at periodic intervals. The periodicity of a particular time interval at which data is pushed may be based on a type of the data, the type of the device 300, the location of the device 300, and/or other criteria. The periodicity of a particular time interval may be adjustable. In some embodiments, the device 300 provides cached data in response to a request (e.g., from the process control big data appliance 102).

Turning to the flash memory 320 of the device 300, the flash memory 320 may be included in the memory 310, or may be a separate memory component (such as a solid-state drive) that is accessible to the multi-processing element processor 308. The flash memory 320 may be included in at least some of the memories $M_X$ shown in FIGS. 1 and 2, for example. Generally, the flash memory 320 stores device configuration data, batch recipes, and/or other data that the device 300 uses to resume operations after exiting an off-line state. For example, when a configuration of a device 300 is downloaded or changed, or when a new or changed batch recipe is downloaded, a snapshot of the corresponding data is stored in the flash memory 320 of the device 300. The content of the flash memory 320 may be used during re-boots, restoration, or at any other time when the device 300 moves from an off-line state into an on-line state. As such, communication burst loadings or spikes associated with the transfer of downloaded data from a workstation to the device 300 after changes in state of the device 300 may be decreased or eliminated. For example, delays in batch processing that occur as a result of the lengthy time required to transfer the recipe information to a controller may be decreased or eliminated. In addition, information stored in the flash memory 320 may be used to trace changes in device configuration and to support a full restoration of configuration parameters and/or batch recipes in the device 300 after a power failure or another event that may cause the device 300 to be off-line.

In an embodiment, all data that is generated by, created by, received at, or observed by the device 300 is caused to be stored in the unitary, logical data storage area. For example, at least a portion of all observed data continually streamed to the unitary, logical data storage area. Observed data that is not immediately streamed may be continually and temporarily stored in the cache 315 (and, in some cases, the flash memory 320). Additionally, the contents of the cache 315 are continually transferred to the process control system big data appliance 102 to free the cache 315 to temporarily store subsequent observed data. Thus, a complete history of operations and device configurations in the process plant 10 is always available at the big data appliance 102 to support operator trends, process analysis, model building, data mining, and other relevant activities.

In transferring data to the big data appliance 102, the device 300 may cause at least a portion of the data in the cache 315 to be transmitted to the unitary, logical data storage area 120 or to an access application corresponding to the data storage area 120 of big data storage appliance 102 via one or more communications networks (e.g., the network backbone 105). Alternatively or additionally, the device 300 may cause at least a portion of the data in the cache 315 to be streamed (e.g., utilizing the SCTP) to the unitary, logical data storage area 120 or to the access application. In an embodiment, the process control system big data appliance 102 or the access application is a subscriber to a streaming service that delivers the cached data from the device 300. For example, the device 300 is a host of the streaming service.

In some embodiments, devices 300 that support big data in process control systems may be utilized for layered or leveled data caching and transmission in a process control network or system 10. In an example scenario, a device 300 transmits its cached data to one or more other intermediate devices or nodes, and the one or more other intermediate devices or nodes, in turn, cache the received data, and cause the received data to be forwarded from its cache for historization at the unitary, logical data storage area (e.g., the process control system big data storage area 120). In an embodiment, in addition to forwarding other devices' data, the one or more intermediate devices collects or captures its own respective directly generated, created or received data, and causes its respective collected data to be transmitted to the big data storage area 120 for historization. The one or more intermediate devices or nodes are located or disposed between the device 300 and the big data storage area 120 so that the location of the one or more intermediate devices or nodes is nearer, closer, or more proximate to the big data storage area 120 within the network 105 than is the location of the device 300.

Figure 4:
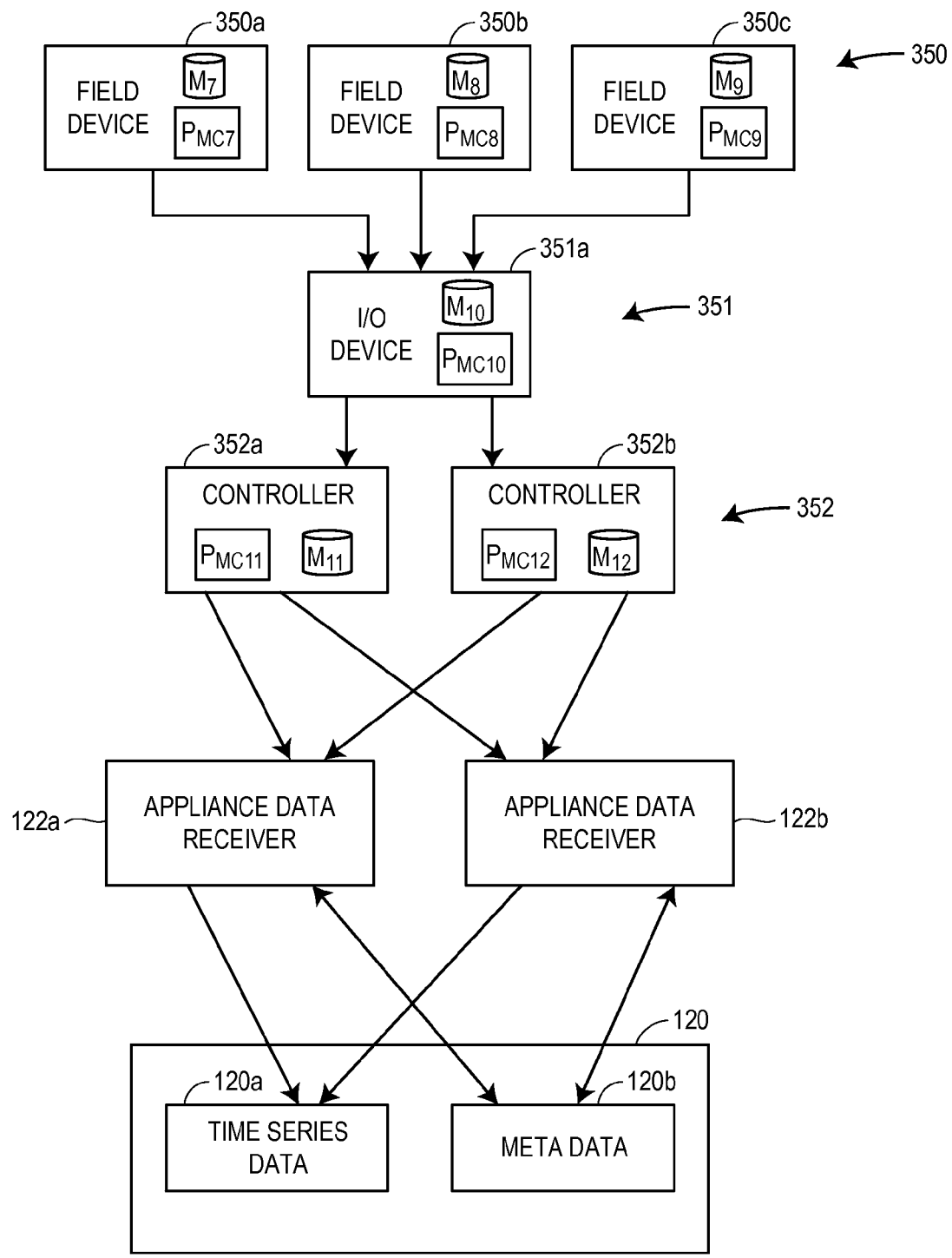
FIG. 4 is a block diagram illustrating an example use of devices that support process control big data for leveled or layered caching and transmission of data for historization.
Figure 5:
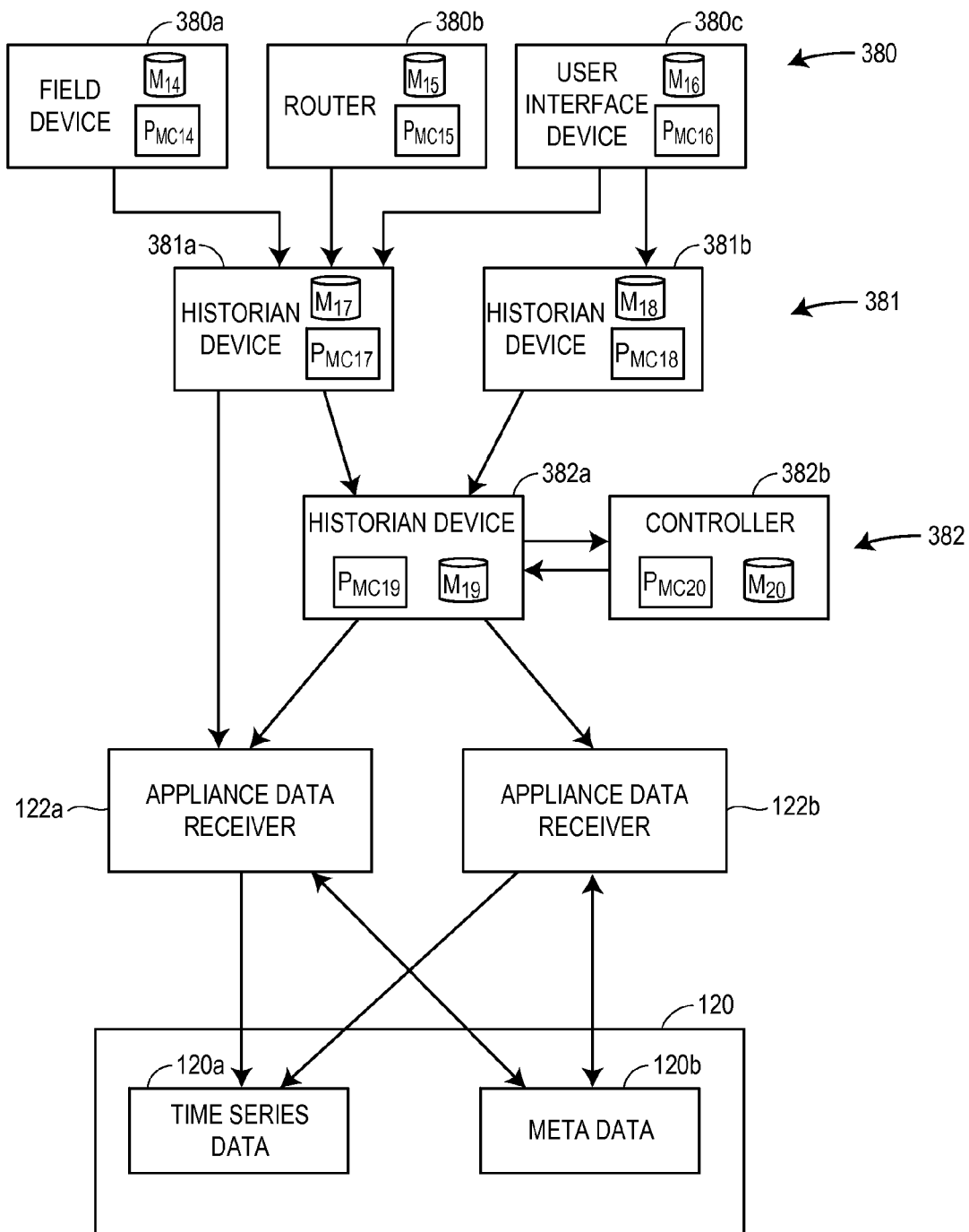
FIG. 5 is a block diagram illustrating an example use of devices that support process control big data for leveled or layered caching and transmission of data for historization.

FIGS. 4 and 5 are example block diagrams which illustrate more detailed concepts and techniques for leveled or layered data caching and transmission using devices that support big data in a process control system. Embodiments of the techniques illustrated by FIGS. 4 and 5 may be utilized, for example, by the device 300 of FIG. 1 or by other suitable devices, and/or in the process control system big data network 100 of FIG. 1 or in other suitable networks. For ease of discussion, though, FIGS. 4 and 5 are discussed with reference to elements in FIGS. 1-3.

FIG. 4 is a block diagram illustrating an example use of devices or nodes that support big data in process control systems (e.g., multiple instances of the device 300 of FIG. 3). In particular, FIG. 4 illustrates an example use of such devices for leveled or layered caching and transmission of data to a centralized data storage area for storage and historization. FIG. 4 shows three example levels 350-352, with the level 350 as having three process control devices 350a-350c, the level 351 as having one process control device 351a, and the level 352 as having two process control devices 352a and 352b. However, the techniques and concepts discussed with respect to FIG. 4 may be applied to any number of levels of data caching and/or transmission, with each level having any number of process control devices. Additionally, although FIG. 4 illustrates only two appliance data receivers 122a, 122b, the techniques and concepts corresponding to FIG. 4 may be applied to any type and any number of appliance data receivers 122.

Each of the process control devices 350a-350c, 351a, 352a and 352b may be an embodiment of the device 300 illustrated in FIG. 3, and may cooperate to control one or more processes in a process control system or plant. For example, at the level 350, the process control devices 350a-350c of FIG. 4 are depicted as field devices configured to perform a physical function to control a process or a process controlled in the process plant 10. The field devices 350a-350c generate process control data corresponding to controlling the process in real-time, for example. At the level 351, the process control device 351a is depicted as an I/O device configured to receive the process control data generated by the field devices 350a-350c. At the level 352, the process control devices 352a and 352b are depicted as process controllers configured to receive the process control data from the I/O device 351a. In some embodiments, the I/O device 351a and the controllers 352a and 352b may each receive additional process control data from other devices or nodes not shown in FIG. 4. The process controllers 352a and 352b may each input the process control data and execute one or more control functions to generate an output (not shown) to control the process.

Furthermore, FIG. 4 illustrates an example use of the process control devices 350a-350c, 351a, 352a and 352b to provide layered or leveled caching in the process control system or plant 10. Each process control device 350a-350c, 351a, 352a and 352b is shown in FIG. 4 as including a respective multi-processing element processor $P_{MCX}$, which may be the multi-processing element processor 308 of FIG. 3. Each process control device 350a-350c, 351a, 352a and 352b is shown in FIG. 4 as including a respective high density memory storage $M_X$, which may include the cache 315 and the flash memory 320 of FIG. 3. Thus, in FIG. 4, the field devices 350a-350c, the I/O device 351a, and the controllers 352a and 352b each store respective collected data along with corresponding timestamps in the respective memory storages $M_7$-$M_{12}$, for example, in a manner such as previously described above. The collected data includes all types of data, and, in particular, includes cached data from other nodes or devices that are disposed further downstream from the unitary, data storage area. The data may be collected at each device 350a-350c, 351a, 352a and 352b at a rate at which the data is generated, created, or received. In an embodiment, the collected data is stored or cached in each of the memory storages $M_7$-$M_{12}$ using a schema that is included in the schema utilized by the process control big data storage area 120.

To illustrate, at the level 350, each of the field devices 350a-350c causes the contents of the cached data in its respective memory storage $M_7$-$M_9$ to be delivered to the I/O device 351a, such as via the process control system big data network 105 or via another communications network. As shown in FIG. 4, the I10 device 351a is an example of an intermediate device or node that is disposed, in the communication path of the network 105, between the field devices 350a-350c and the big data storage area 120, e.g., the I/O device 351a is disposed upstream of the field devices 350a-350c. The field devices 350a-350c may stream their respective cached data to the I10 device 351a, or the field devices 350a-350c may periodically transmit the contents of their respective cached data to the I/O device 351a.

At the level 351, the I/O device 351a caches, in the memory storage $M_{10}$, the data received from the field devices 350a-350c (and, in some embodiments, also caches data received from other devices) along with other data that the I/O device 351a directly generates and receives. The data that is collected and cached at the I/O device 351a (including the contents of the cache of the field devices 350a-350c) may then be transmitted and/or streamed to the controllers 352a and 352b, such as by using the communications network 105 or some other communications network. In an embodiment, a portion of the cached data at the I/O device 351a is transmitted to the controller 352a, and a different portion of the cached data at the 110 device 351a is transmitted to the controller 352b. The controllers 352a, 352b are shown in FIG. 4 as another set of intermediate devices disposed in the communication path of the network 105 between the field devices 350a-350c and the big data storage area 120, e.g., the controllers 352a, 35b are upstream of the field devices 350a-350c and the I/O device 351a.

At the level 352, the controllers 352a and 352b each cache, in respective memory storages $M_{11}$ and $M_{12}$, respective data received from the I/O device 351a, and each aggregate the data from the device 351a with data that the controllers 352a and 352b themselves each directly generate and receive. In FIG. 4, the controllers 352a and 352b then cause the aggregated cached data to be delivered and/or streamed to the process control big data storage area 120.

Each of the controllers 352a and 352b may transmit at least some of its respective cached data to one or more appliance data receivers 122a, 122b (e.g., by using the network backbone 105). In an embodiment, at least one of the controllers 352a or 352b pushes at least some of the data from its respective cache (e.g., the memory storage $M_{11}$ or $M_{12}$) when the cache is filled to a particular threshold. The threshold of the cache may be adjustable, in an embodiment. At least one of the controllers 352a or 352b may push at least some of data from the respective cache when a resource (e.g., a bandwidth of the network 105 or some other resource) is sufficiently available. An availability threshold of a particular resource may be adjustable, in an embodiment.

In some embodiments, at least one of the controllers 352a or 352b pushes at least some of the data stored in the respective cache at periodic intervals. The periodicity of a particular time interval at which data is pushed may be based on a type of the data, the type of controller, the location of the controller, and/or other criteria, and the periodicity of a particular time interval may be adjustable. In some embodiments, at least one of the controllers 352a or 352b provides data in response to a request (e.g., from the process control big data appliance 102).

In some embodiments, at least one of the controllers 352a or 352b streams at least some of its respective collected data in real-time as the data is generated by, created by, or received at each of the controllers 352a and 352b (e.g., the controller may not store or cache the data, or may store the data for only as long as it takes the controller to process the data for streaming). For example, at least some of the data is streamed to the appliance data receivers 122a, 122b by using a streaming protocol. In an embodiment, at least one of the controllers 352a, 352b hosts a respective streaming service, and at least one of the data receivers 122a, 122b and/or the data storage area 120 may subscribe to the streaming service.

Accordingly, transmitted data may be received by the appliance data receivers 122a and 122b, for example, via the network backbone 105. In an embodiment, a particular appliance data receiver 122a or 122b is designated to receive data from one or more particular devices or nodes. In an embodiment, a particular appliance data receiver 122a or 122b is designated to receive data from only one or more particular types of devices or nodes (e.g., controllers, routers, or user interface devices). In some embodiments, a particular appliance data receiver 122a or 122b is designated to receive only one or more particular types of data (e.g., process control data only or network management data only).

The appliance data receivers 122a and 122b may cause the data to be stored or historized in the big data appliance storage area 120, e.g., as part of the big data set corresponding to the process plant 10. In an example, the data received by the appliance data receivers 122a and 122b is stored in the data storage area 120 using the process control big data schema. In FIG. 4, the time series data 120a is illustrated as being stored separately from corresponding metadata 120b, although in some embodiments, at least some of the metadata 120b may be integrally stored with the time series data 120a.

In an embodiment, data that is received via the plurality of appliance data receivers 122a and 122b is integrated so that data from multiple sources may be combined (e.g., into a same group of rows of the data storage area 120). In some scenarios, data that is received via the plurality of appliance data receivers 122a and 122b is cleaned to remove noise and inconsistent data. An appliance data receiver 122a, 122b performs data cleaning and/or data integration on at least some of the received data before the received data is stored, in an embodiment, and/or the process control system big data appliance 102 cleans some or all of the received data after the received data has been stored in the storage area 102, in an embodiment.

Turning now to FIG. 5, FIG. 5 is a block diagram illustrating an example use of devices that support big data in process control systems and plants for leveled or layered data caching and transmission. FIG. 5 includes three example levels 380-382, with the level 380 having three devices 380a-380c, the level 381 having two devices 381a and 381b, and the level 382 having two devices 382a and 382b. However, the techniques and concepts discussed with respect to FIG. 5 may be applied to any number of levels having any number of devices. Any of the devices 380a-380c, 381a-38b, or 382a-382b may be a provider node or device 110, a user interface node or device 112, or another node or device 115 supporting big data in a process control environment or plant.

Additionally, each of the devices 380a-380c, 381a, 381b, 382a and 382b may be an embodiment of the device 300 illustrated in FIG. 3. In FIG. 5, each of the devices 380a-380c, 381a, 381b, 382a and 382b is shown as including a respective multi-processing element processor $P_{MCX}$ (which may include the multi-processing element processor 308 in FIG. 3) and a respective high density memory storage $M_X$ (which may include the cache 315 and the flash memory 320 in FIG. 3).

As shown in FIG. 5, at the level 380, each of the devices 380a-380c is a different type of device. In particular, the device 380a is illustrated as a field device configured to perform a physical function to control a process or a process controlled in the process plant 10. The device 380b is illustrated as a router configured to route wireless packets from one wireless device to another wireless device within a wireless network. The device 380c is illustrated as a user interface device configured to allow a user or operator to interact with the process control system or process plant 10. In FIG. 5, each of the devices 380a-380c generates and caches observed data along with corresponding timestamps in respective memory storages $M_{14}$-$M_{16}$, and then transmits and/or streams the contents in the memory storages $M_{14}$-$M_{16}$ to devices or nodes included at the next level 381.

At the level 381, the devices 381a and 381b are shown as historian devices configured to temporarily store (e.g., cache) data received from the devices 380a-380c and/or other data that is accumulated throughout the process control system 10 in the respective memory storages $M_{17}$ and $M_{18}$. In some embodiments, the historian devices 381a and 381b are configured to receive specific types of data on a level or data from specific devices or nodes on the level. For example, the historian device 381a receives data from all devices or nodes on the level 380. In another example, the historian device 381a receives data from only field devices (e.g., the field device 380a) and networking devices (e.g., the router 380b) on the level 380. In still another example, the historian device 381b receives only user interface-related data such as user commands, user queries, etc. from user interface devices (e.g., the user interface device 380c) on the level 380.

As shown in FIG. 5, in some embodiments, at least one historian device (e.g., the historian device 381a) transmits and/or streams at least a portion of its cached data directly to the big data storage area 120 (e.g., via appliance data receiver 122a). In some embodiments, the historian devices 381a and 381b transmit and/or stream the contents in the memory storages $M_{17}$ and $M_{18}$ to the next level 382. At the level 382, the device 382a is depicted as another historian device, and the device 382b is depicted as a process controller. The historian device 382 receives and stores (e.g., caches) data from the historian devices 381a and 381b in the memory storage $M_{19}$. As well, the historian device 382a may be configured to receive data from the controller 382b, e.g., when the controller 382b is proximately located near the historian device 382a, or when the controller 382b is on the same caching level as the historian device 382a. In some cases, the controller 382b may include embedded data analytics applications, which requires the controller 382b to read both real-time process control data as well as acquire history streaming data from the historian 382a. In any event, once data is received and stored by the historian device 382a, the historian device 382a delivers and/or streams the aggregated data to the process control big data storage area 120 via the one or more appliance data receivers 122a, 122b.

Generally, various types of data may be cached at different nodes of the process control system big data network 100 using different leveling or layering schemes. In an embodiment, data corresponding to controlling a process is cached and delivered in a layered manner using provider devices 110 whose primary functionality is control (e.g., field devices, I10 devices, controllers, such as in the example scenario illustrated by FIG. 4), whereas data corresponding to network traffic is cached and delivered in a layered manner using provider devices 110 whose primary functionality is traffic management (e.g., routers, access points, and gateways). In an embodiment, data is delivered to the unitary, logical data storage area via historian nodes or devices as illustrated in FIG. 5. For example, downstream historian nodes or devices (e.g., further away from the big data appliance 102) deliver or stream cached data to upstream historian nodes or devices (e.g., closer to the big data appliance 102), and ultimately the historian nodes or devices that are immediately downstream of the process control big data appliance 102 deliver or stream respective cached data for storage at the process control big data appliance 102.

In an embodiment, leveled or layered data caching and transmission is performed by nodes 110 that communicate with each other using the process control system big data network backbone 105. In an embodiment, at some nodes 110 involved in layered or leveled caching communicate cached data to nodes 110 at a different level using another communications network and/or other protocol, such as HART, WirelessHART, Fieldbus, DeviceNet, WiFi, Ethernet, or other protocol.

Of course, while leveled or layered caching has been discussed with respect to provider devices or nodes 110, the concepts and techniques may apply equally to user interface devices nodes 112 and/or to other types of devices or nodes 115 that support big data in process control plants and systems. In an embodiment, a subset of the devices or nodes 108 perform leveled or layered data caching and transmission, while another subset of the devices or nodes 108 cause their cached/collected data to be directly delivered to the process control big data appliance 102 without being cached or stored at an intermediate node. In some embodiments, historian nodes cache data from multiple different types of devices or nodes, e.g., from a provider device 110 and from a user interface device 112.

Figure 6:
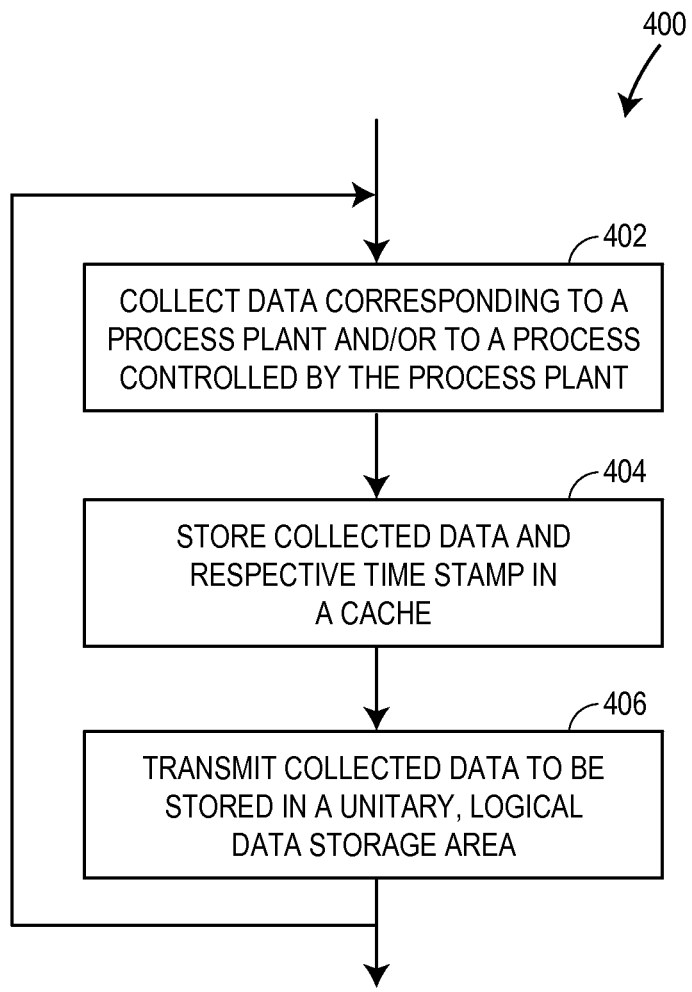
FIG. 6 is a flow diagram of an example method for using devices that support big data in a process control system or process plant.

FIG. 6 illustrates a flow diagram of an example method 400 for using devices to support big data in process plants and process control systems. The method 400 may be performed, for example, with the device 300 of FIG. 3, with the leveled or layered data caching and transmission techniques shown in FIGS. 4 and 5, with the provider nodes or devices 110 of FIG. 2, and/or with the plurality of devices or nodes 108 of the process control big data network 100 of FIG. 1. In an embodiment, the method 400 is implemented by at least a portion of the process control system big data network 100 of FIG. 1.

At a block 402, data may be collected at a device that supports big data in process control plants or networks. The device may be communicatively coupled to a communications network of a process plant or process control system, such as the process control system big data network 100. The device may be a field device, a process controller, an I/O device, a gateway device, an access point, a routing device, a network management device, a user interface device, a historian device, or some other device configured to collect big data associated with the process plant or with a process controlled by the process plant. The collected data may include measurement data, event data, batch data, calculated data, configuration data and continuous data. Accordingly, the collected data generally includes all types of data that are generated by, created by, received at, or observed by the device. The data may be collected without an identification of the data being included a priori in a configuration of the device. Further, the data may be collected at the process control device at a rate of generation by the device, a rate of creation by the device, or at a rate of reception at the device, again without requiring the rate to be included a priori in the configuration of the device.

At a block 404, the collected data may be stored in a cache along with an indication of when the data was captured or collected (e.g., a timestamp) at the device. The cache is included in the device, for example. In an embodiment, the data and its respective timestamp may be stored in an entry of the cache. In embodiments where multiple values of the data are obtained over time (block 402), each value may be stored, along with its respective timestamp, in the same entry or in a different entry of the cache. The schema utilized by the cache to store entries may be included in a schema utilized by a data storage entity at which the cached data is to be historized, such as the process control big data storage area 120 or other suitable big data storage area. In some embodiments, the block 404 is omitted, such as when collected data is immediately streamed from the device to be historized at a process control system big data storage area.

At a block 406, at least a portion of the data stored in the cache is caused to be transmitted for storage to a unitary, logical storage area corresponding to the process plant (e.g. the big data storage area 120 in FIG. 1), thus freeing up at least a portion of the cache to store subsequent data. The unitary, logical data storage area is configured to store, using a common format or schema, multiple types of data related to the process plant or the process controlled by the process plant. In an embodiment, transmitting the data includes causing at least a portion of the data in the cache to be periodically transmitted. Additionally or alternatively, transmitting the data includes causing at least a portion of the data in the cache to be streamed. In an embodiment, transmitting the data stored in the cache includes selecting or determining an entry of the cache for transmission, where the contents (e.g., the value of the data and the respective timestamp included in the selected entry) may be transmitted to the communications network. In some embodiments, the method 400 returns to the block 402, and the steps of collecting, storing and transmitting data are repeated.

In an embodiment, at least a portion of the data that is transmitted to the unitary, logical storage area for storage (block 406) is transmitted, via the communications network, to other process control devices or nodes disposed in the communications network between the process control device and the unitary logical data storage area. The other process control devices or nodes may be configured to temporarily store the at least the portion of the data and forward the at least a portion of the data to the unitary, logical data storage area. In an embodiment, at least a portion of the data that is transmitted to the unitary, logical storage area is also transmitted to other devices or nodes of the process control system or plant 10.

Embodiments of the techniques described in the present disclosure may include any number of the following aspects, either alone or combination:

1. A method of delivering data using a device communicatively coupled to a communications network of a process plant, where the process plant includes devices and equipment configured to control one or more processes. The method may comprise collecting data at the device, where the data includes at least one of: (i) data that is generated by the device (e.g., for transmission from the device), (ii) data that is created by the device, or (iii) data that is received at the device. The data may correspond to at least one of the process plant or to a process controlled by the process plant, and a type of the device may be included in a set of device types, where the set of device types includes a field device and a controller. The method may further include storing the collected data in a cache of the device, and causing at least a portion of the collected data to be transmitted for storage in a unitary, logical data storage area of a process control big data appliance corresponding to the process plant. The unitary, logical data storage area may be configured to store, using a common format, multiple types of data from a set of types of data corresponding to at least one of the process plant or the process controlled by the process plant, and the set of types of data may include continuous data, event data, measurement data, batch data, calculated data, and configuration data.

2. The method of the preceding aspect, wherein collecting the data comprises at least one of: collecting all data that is generated for transmission by the device, collecting all data created by the device, or collecting all data that is received at the device.

3. The method of any of the preceding aspects, wherein collecting the data comprises at least one of: collecting data that is generated for transmission by the device at a rate of generation, collecting data that is created by the device at a rate of creation, or collecting all data that is received at the device at a rate of reception.

4. The method of any of the preceding aspects, wherein collecting the data at the device comprises collecting, at the device, at least one type of data included in the set of types of data.

5. The method of any of the preceding aspects, wherein: the data is first data, the device is a first device, and the set of device types further includes an input/output (I/O) device having a field device interface and a controller interface.

Additionally, the method may further comprise receiving, at the first device, second data that is at least one of (i) generated for transmission by a second device, (ii) created by the second device, or (iii) received at the second device, where the second device has a device type of one of the field device, the controller, or the I/O device. The method may include storing the second data in the cache of the first device, and causing at least a portion of the second collected data to be transmitted for storage in the unitary, logical data storage area of the process control big data appliance.

6. The method of any of the preceding aspects, wherein the first device has a device type of one of the field device, the controller, or the I/O device.

7. The method of any of the preceding aspects, wherein causing the at least the portion of the second collected data to be transmitted comprises integrally transmitting the at least the portion of the second collected data with the at least the portion of the first collected data.

8. The method of any of the preceding aspects, wherein storing the collected data in the cache includes storing, in conjunction with the collected data in the cache, indications of respective times of generation or reception of the collected data; and wherein causing the at least the portion of the collected data to be transmitted comprises causing the at least the portion of the collected data and the respective times of generation or reception of the at least the portion of the collected data to be transmitted.

9. The method of any of the preceding aspects, wherein storing the collected data in the cache of the device comprises storing the collected data in the cache using a schema that is included in a schema corresponding to the common format used by the unitary, logical data storage area.

10. The method of any of the preceding aspects, wherein causing the data to be transmitted comprises streaming the data.

11. The method of any of the preceding aspects, wherein streaming the data comprises streaming the data using a stream control transmission protocol (SCTP).

12. The method of any of the preceding aspects, further comprising providing a streaming service via which the data is streamed to one or more subscribers of the streaming service.

13. The method of any of the preceding aspects, wherein causing the at least the portion of the data to be transmitted for storage in the unitary, logical data storage area comprises transmitting, via a communications network, the at least the portion of the data to another device disposed in the communications network between the device and the unitary logical data storage area.

14. The method of any of the preceding aspects, wherein transmitting the at least the portion of the data to the another device comprises transmitting the at least the portion of the data to one of: a process control device configured to control the process in real-time in the process plant, a network management or routing device, or another device configured to temporarily store the at least the portion of the data and to forward the at least a portion of the data to the unitary, logical data storage area.

15. The method of any of the preceding aspects, wherein the set of devices types further includes an input/output (I/O) device having a field device interface and a controller interface, a user interface device, a gateway device, an access point, a routing device, and a network management device.

16. A device for controlling a process in a process plant includes an interface to a communications network of the process plant and a cache configured to store data (e.g., temporarily store data). The data may include at least one of: (i) data generated for transmission by the device, (ii) data created by the device, or (iii) data received by the device, and the data may correspond to at least one of the process plant or the process controlled in the process plant. The device may include a multi-processing element processor having at least one processing element designated to cause the data to be stored in the cache and to cause at least a portion of the data to be transmitted, via the communications network, for storage at a centralized data storage area corresponding to the process plant. The device may be a process control device, for example, a field device configured to perform a physical function to control the process, a controller configured to receive an input and generate, based on the input, an output to control the process, or an input/output (I/O) device disposed between and communicatively connecting the field device and the controller. In an embodiment, the device may be configured to perform any portions of any of the preceding aspects.

17. The device of the preceding aspect, wherein at least one of: a first processing element of the multi-processing element processor is designated to cause the data to be stored in the cache; a second processing element of the multi-processing element processor is designated to cause the at least the portion of the data to be transmitted, or a third processing element of the multi-processing element processor is designated to operate the device to control the process in the process plant in real-time.

18. The device of any of the preceding aspects, wherein at least one of: the first processing element of the multi-processing element processor is exclusively designated to at least one of cause the data to be stored in the cache or cause the at least the portion of the data to be transmitted, or the third processing element of the multi-processing element processor is exclusively designated to operate the device to control the process in the process plant.

19. The device of any of the preceding aspects, wherein the centralized data storage area is a unitary, logical data storage area of a process control big data appliance corresponding to the process plant. The unitary, logical data storage area may be configured to store, using a common format, multiple types of data corresponding to at least one of the process plant or the process controlled in the process plant. The multiple types of data may be included in a set of types of data comprising continuous data, measurement data, event data, calculated data, configuration data, and batch data.

20. The device of any of the preceding aspects, wherein the common format of the unitary, logical data storage area comprises a common schema, the common schema including a local schema used to store the data in the cache of the device.

21. The device of any of the preceding aspects, wherein the multi-processing element processor is configured to cause the at least the portion of the data stored in the cache to be streamed via the communications network.

22. The device of any of the preceding aspects, wherein the multi-processing element processor is configured to provide a streaming service to which at least one of the centralized data storage area or an access application corresponding to the centralized data storage area subscribes.

23. The device of any of the preceding aspects, wherein the data stored in the cache includes at least one of measurement data, calculated data, configuration data, batch data, event data, or continuous data.

24. The device of any of the preceding aspects, wherein the data is stored in the cache in conjunction with respective timestamps. Each respective timestamp may be indicative of a time of data generation or reception of a respective datum included in the data, and the multi-processing element processor may be configured to cause the at least the portion of the data and the respective timestamps corresponding to the at least the portion of the data to be transmitted for storage at the centralized data storage area.

25. The device of any of the preceding aspects, wherein a configuration of the device excludes indications of one or more identities of data to be collected and stored in the cache.

26. The device of any of the preceding aspects, wherein the data to be stored in the cache includes at least one of (i) all data generated for transmission by the device, (ii) all data created by the device, or (iii) all data received by the device.

27. The device of any of the preceding aspects, further comprising a flash memory configured to store at least one of: (i) at least a portion of a configuration of the device, or (ii) a batch recipe corresponding to the device, wherein a content of the flash memory is accessed by the device to resume operations after exiting an off-line state.

28. The device of any of the preceding aspects, wherein the communications network includes at least one of a wired communications network or a wireless communications network.

29. The device of any of the preceding aspects, wherein the interface is a first interface, the communications network is a first communications network, and the device further comprises a second interface coupled to a second communications network different from the communications network, the second interface used by the device to at least one of transmit or receive signals to control the process in real-time.

30. A system for supporting big data in a process plant, wherein the system includes a communications network having a plurality of nodes. The communications network may be configured to deliver data to be stored at a unitary, logical data storage area, and the unitary, logical data storage area may be configured to store, using a common format, multiple types of data from a set of data types corresponding to at least one of the process plant or a process controlled by the process plant. The set of data types may include continuous data, event data, measurement data, batch data, calculated data, and configuration data.

Each node of the plurality of nodes may be configured to (i) cache respective first data that is at least one of generated by, created by, or received at the each node, and to (ii) cause at least a portion of the cached data to be transmitted, via the communications network, for storage or historization at the unitary, logical data storage area. At least one node of the plurality of nodes is further configured to (iii) receive second data that is at least one of generated by, created by, or received at another node of the plurality of nodes, and to (iv) cause the second data to be transmitted for storage at the unitary, logical data storage area. The system may include a device according to any of the preceding aspects, and/or may perform at least a portion of a method according to any of the preceding aspects.

31. The system of the preceding aspect, wherein the plurality of nodes includes a controller configured to receive a set of inputs, determine a value of an output, and cause the output to be transmitted to a field device to control the process in the process plant, and wherein the field device is configured to perform a physical function based on the output of the controller to control the process.

32. The system of any of the preceding aspects, wherein the communications network is a first communications network, and wherein the controller is configured to at least one of: receive at least one input of the set of inputs at an interface to a second communications network, or cause the output to be transmitted to the field device via the interface to the second communications network.

33. The system of any of the preceding aspects, wherein the field device is a first field device, the controller is included in the at least one node of the plurality of nodes configured to receive the second data, and the another node is the first field device or a second field device.

34. The system of any of the preceding aspects, wherein: a first node of the plurality of nodes is disposed in the communications network between a second node of the plurality of nodes and the unitary, logical data storage area, the first node is included in the at least one node of the plurality of nodes configured to receive the second data that is at least one of generated by, created by, or received at the another node, and the another node is the second node.

35. The system of any of the preceding aspects, wherein the first node is further configured to cache the received second data.

36. The system of any of the preceding aspects, wherein the second node of the plurality of nodes is disposed in the communications network between the first node and a third node of the plurality of nodes, and wherein the second node is configured to (i) cache the second data, (ii) cache third data that is at least one of generated by, created by, or received at the third node, and (iii) cause the cached data to be transmitted to the first node to be forwarded for storage at the unitary, logical data storage area.

37. The system of any of the preceding aspects, wherein the communications network supports a streaming protocol.

38. The system of any of the preceding aspects, wherein at least one node of the plurality of nodes is configured to host a respective streaming service to which at least the unitary, logical data storage area or an access application of the unitary, logical data storage area subscribes.

39. The system of any of the preceding aspects, wherein a schema used by at least a subset of the plurality of nodes to cache the respective first data is included in a schema included in the common format used by the unitary, logical data storage area.

40. The system of any of the preceding aspects, wherein the plurality of nodes includes at least two devices from a set of devices including a controller, a field device, an input/output (I/O) device, a user interface device; a gateway device; an access point; a routing device; a historian device; and a network management device. The controller may be configured to receive a set of inputs, determine a value of an output, and cause the output to be transmitted to a field device to control the process in the process plant. The field device may be configured to perform a physical function based on the output of the controller to control the process, and the I/O device may include a field device interface and a controller interface.

When implemented in software, any of the applications, services, and engines described herein may be stored in any tangible, non-transitory computer readable memory such as on a magnetic disk, a laser disk, solid state memory device, molecular memory storage device, or other storage medium, in a RAM or ROM of a computer or processor, etc. Although the example systems disclosed herein are disclosed as including, among other components, software and/or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software. Accordingly, while the example systems described herein are described as being implemented in software executed on a processor of one or more computer devices, persons of ordinary skill in the art will readily appreciate that the examples provided are not the only way to implement such systems.

Thus, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed:

1. A method of delivering data using a device communicatively coupled to a communications network of a process plant, the process plant having equipment configured to control one or more processes, and the method comprising:
    collecting data at the device,
        the data including at least one of: (i) data that is generated by the device, (ii) data that is created by the device, or (iii) data that is received at the device, the data corresponding to at least one of the process plant or a process controlled by the process plant, and
        a type of the device is included in a set of device types, the set of device types including a field device and a controller;
    storing, in a cache of the device, the collected data; and
    causing at least a portion of the collected data to be transmitted for storage at a unitary, logical data storage area of a process control big data appliance corresponding to the process plant,
        the unitary, logical data storage area being configured to store, using a common format, multiple types of data from a set of types of data corresponding to at least one of the process plant or the process controlled by the process plant;
        the set of types of data including continuous data, event data, measurement data, batch data, calculated data, and configuration data; and
        a schema used to store the collected data in the cache of the device is included in a schema corresponding to the common format used by the unitary, logical data storage area.

2. The method of claim 1, wherein collecting the data comprises at least one of: collecting all data that is generated by the device, collecting all data that is created by the device, or collecting all data that is received at the device.

3. The method of claim 1, wherein collecting the data comprises at least one of: collecting data that is generated by the device at a rate of generation, collecting all data that is created by the device at a rate of creation, or collecting all data that is received at the device at a rate of reception.

4. The method of claim 1, wherein:
    the data is first data, the device is a first device, and the set of device types further includes an input/output (I/O) device having a field device interface and a controller interface; and
    the method further comprises:
        receiving, at the first device, second data that is at least one of (i) generated or created by a second device, or (ii) received at the second device, the second device having a device type of one of the field device, the controller, or the I/O device;
        storing, in the cache of the first device, the second data; and
        causing at least a portion of the second collected data to be transmitted for storage in the unitary, logical data storage area of the process control big data appliance.

5. The method of claim 4, wherein the second device has a device type of one of the field device, the controller, or the I/O device.

6. The method of claim 1, wherein:
    storing the collected data in the cache includes storing, in conjunction with the collected data in the cache, indications of respective times of generation or reception of the collected data; and
    causing the at least the portion of the collected data to be transmitted comprises causing the at least the portion of the collected data and the respective times of generation or reception of the at least the portion of the collected data to be transmitted.

7. The method of claim 1, wherein causing the data to be transmitted comprises streaming the data using a stream control transmission protocol (SCTP).

8. A process control device for controlling a process in a process plant, comprising: an interface to a communications network of the process plant;
    a cache configured to store data,
        the data including at least one of: (i) data generated by the process control device for transmission, (ii) data created by the process control device, or (iii) data received by the process control device, and
        the data corresponding to at least one of the process plant or the process controlled in the process plant; and
    a multi-processing element processor having at least one processing element designated to cause the data to be stored in the cache and to cause at least a portion of the data to be transmitted, via the communications network, for storage at a centralized data storage area corresponding to the process plant,
    wherein the process control device is one of:
        a field device configured to perform a physical function to control the process,
        a controller configured to receive an input and generate, based on the input, an output to control the process, or
        an input/output (I/O) device disposed between and communicatively connecting the field device and the controller; and
    wherein a schema used to store the collected data in the cache of the process control device is included in a schema corresponding to a common format used by the centralized data storage area to store data.

9. The process control device of claim 8, wherein at least one of:
    a first processing element of the multi-processing element processor is designated to cause the data to be stored in the cache;
    a second processing element of the multi-processing element processor is designated to cause the at least the portion of the data to be transmitted; or
    a third processing element of the multi-processing element processor is designated to operate the process control device to control the process in the process plant in real-time.

10. The process control device of claim 9, wherein at least one of:

the first processing element of the multi-processing element processor is exclusively designated to at least one of cause the data to be stored in the cache or cause the at least the portion of the data to be transmitted, or the third processing element of the multi-processing element processor is exclusively designated to operate the process control device to control the process in the process plant.

11. The process control device of claim 8, wherein:
the centralized data storage area is a unitary, logical data storage area of a process control big data appliance corresponding to the process plant,
the unitary, logical data storage area is configured to store, using the common format, multiple types of data corresponding to at least one of the process plant or the process controlled in the process plant, and
the multiple types of data are included in a set of types of data comprising continuous data, measurement data, event data, calculated data, configuration data, and batch data.

12. The process control device of claim 8, wherein the data stored in the cache includes at least one of measurement data, calculated data, configuration data, batch data, event data, or continuous data.

13. The process control device of claim 8, wherein the multi-processing element processor is configured to cause the at least the portion of the data stored in the cache to be streamed via the communications network.

14. The process control device of claim 8, wherein a configuration of the process control device excludes indications of one or more identities of data to be stored in the cache.

15. The process control device of claim 8, further comprising a flash memory configured to store at least one of: (i) at least a portion of a configuration of the process control device, or (ii) a batch recipe corresponding to the process control device, wherein a content of the flash memory is accessed by the process control device to resume operations after exiting an off-line state.

16. The process control device of claim 8, wherein the communications network includes at least one of a wired communications network or a wireless communications network.

17. A system for supporting big data in a process plant, the system comprising: a communications network having a plurality of nodes,
the communications network configured to deliver data to be stored at a unitary, logical data storage area;
the unitary, logical data storage area configured to store, using a common format, multiple types of data from a set of data types corresponding to at least one of the process plant or a process controlled by the process plant, and the set of data types including continuous data, event data, measurement data, batch data, calculated data, and configuration data;
each node of the plurality of nodes configured to (i) cache, using a schema that is included in a schema corresponding to the common format used by the unitary, logical data storage area, respective first data that is at least one of generated by, created by, or received at the each node, and to (ii) cause at least a portion of the cached data to be transmitted, via the communications network, for storage at the unitary, logical data storage area; and
at least one node of the plurality of nodes is further configured to (iii) receive second data that is at least one of generated by, created by, or received at another node of the plurality of nodes, and to (iv) cause the second data to be transmitted for storage at the unitary, logical data storage area.

18. The system of claim 17, wherein:
a first node of the plurality of nodes is disposed in the communications network between a second node of the plurality of nodes and the unitary, logical data storage area;
the first node is included in the at least one node of the plurality of nodes configured to receive the second data that is at least one of generated by, created by, or received at the another node; and the another node is the second node.

19. The system of claim 17, wherein the plurality of nodes includes at least two devices from a set of devices including:
a controller configured to receive a set of inputs, determine a value of an output, and cause the output to be transmitted to a first field device to control the process in the process plant, the first field device being configured to perform a physical function based on the output of the controller to control the process;
the first field device or a second field device;
an input/output (I/O) device having a field device interface and a controller interface;
a user interface device;
a gateway device;
an access point;
a routing device;
a historian device; and
a network management device.

* * * * *